US009990760B2

(12) United States Patent
Aguilera Perez et al.

(10) Patent No.: US 9,990,760 B2
(45) Date of Patent: Jun. 5, 2018

(54) GENERATING A 3D INTERACTIVE IMMERSIVE EXPERIENCE FROM A 2D STATIC IMAGE

(71) Applicant: 3Ditize SL, San Sebastian (ES)

(72) Inventors: Jaime Aguilera Perez, Alcobendas (ES); Fernando Alonso Blazquez, Zumarraga (ES); Juan Bautista Gómez Fernandez, Barcelona (ES)

(73) Assignee: 3ditize SL, San Sebastian (ES)

( * ) Notice: Subject to any disclaimer, the term of this patent is extended or adjusted under 35 U.S.C. 154(b) by 383 days.

(21) Appl. No.: 14/469,814

(22) Filed: Aug. 27, 2014

(65) Prior Publication Data
US 2015/0062125 A1 Mar. 5, 2015

Related U.S. Application Data

(60) Provisional application No. 61/872,969, filed on Sep. 3, 2013.

(51) Int. Cl.
*G06T 15/00* (2011.01)
*G06T 19/00* (2011.01)
(Continued)

(52) U.S. Cl.
CPC .............. *G06T 15/20* (2013.01); *G06T 7/543* (2017.01); *G06T 7/75* (2017.01); *G06T 19/003* (2013.01);
(Continued)

(58) Field of Classification Search
USPC ........................................ 345/419, 427, 156
See application file for complete search history.

(56) References Cited

U.S. PATENT DOCUMENTS 7,583,275 B2 * 9/2009 Neumann ............... G06T 17/00
345/419
8,254,667 B2 8/2012 Kim et al.
(Continued)

FOREIGN PATENT DOCUMENTS

JP 11-73522 3/1999
JP 2002-024861 1/2002
(Continued)

OTHER PUBLICATIONS

Henrichsen, Arne, "3D Reconstruction and Camera Calibration from 2D Images", University of Cape Town, Dec. 2000, pp. 1-109.
(Continued)

*Primary Examiner* — Kimbinh T Nguyen
(74) *Attorney, Agent, or Firm* — Raubvogel Law Office

(57) ABSTRACT

A two-dimensional (2D) static image may be used to generate a three-dimensional (3D) interactive immersive experience. An image type of the 2D image may first be identified. The image type may be selected from a set of types such as interior, exterior, people, corridor, landscape, and other. Each image type may have an associated main feature type. The main feature of the 2D image may be identified using the corresponding main feature type. Then, unless the 2D image is of the "other" image type, a 3D object with two or more planes may be generated. The planes may intersect on the identified main feature. A virtual camera may be positioned proximate the 3D object, and a 3D view of the 3D object may be generated and displayed for the user. The user may optionally move the virtual camera, within limits, to view the 3D object from other locations.

45 Claims, 22 Drawing Sheets

(51) Int. Cl.
*G06T 15/20* (2011.01)
*G06T 7/73* (2017.01)
*G06T 7/543* (2017.01)

(52) U.S. Cl.
CPC ............... *G06T 2200/04* (2013.01); *G06T 2207/10004* (2013.01); *G06T 2207/20101* (2013.01); *G06T 2207/20164* (2013.01); *G06T 2207/30201* (2013.01)

(56) References Cited

U.S. PATENT DOCUMENTS

| | | | | |
|---|---|---|---|---|
| 8,369,610 | B1* | 2/2013 | Korobkin | G06T 17/10 382/154 |
| 8,705,892 | B2 | 4/2014 | Aguilera et al. | |
| 9,122,368 | B2* | 9/2015 | Szeliski | G06F 3/04815 715/205 |
| 2004/0104935 | A1* | 6/2004 | Williamson | G06F 3/012 715/757 |
| 2005/0083248 | A1* | 4/2005 | Biocca | A41D 31/0088 345/8 |
| 2006/0066612 | A1 | 3/2006 | Yang et al. | |
| 2006/0132482 | A1* | 6/2006 | Oh | G06T 13/80 345/419 |
| 2008/0033641 | A1 | 2/2008 | Medalia | |
| 2009/0128577 | A1* | 5/2009 | Gloudemans | G06T 15/20 345/582 |
| 2010/0110069 | A1* | 5/2010 | Yuan | G06T 15/20 345/419 |
| 2010/0208033 | A1* | 8/2010 | Edge | G06F 3/012 348/46 |
| 2010/0315412 | A1 | 12/2010 | Sinha et al. | |
| 2011/0273451 | A1* | 11/2011 | Salemann | G06T 17/05 345/427 |
| 2012/0050525 | A1 | 3/2012 | Rinner et al. | |
| 2012/0099804 | A1 | 4/2012 | Perez et al. | |
| 2013/0222385 | A1 | 8/2013 | Dorsey et al. | |
| 2013/0249792 | A1* | 9/2013 | Carraro | G06T 19/003 345/156 |
| 2013/0254666 | A1* | 9/2013 | Snavely | G06F 17/30274 715/731 |
| 2014/0132594 | A1 | 5/2014 | Gharpure et al. | |
| 2014/0198178 | A1 | 7/2014 | Ioffe et al. | |
| 2015/0212688 | A1 | 7/2015 | Mcmillan et al. | |
| 2015/0358613 | A1* | 12/2015 | Sandrew | G06T 15/205 348/36 |

FOREIGN PATENT DOCUMENTS

| | | |
|---|---|---|
| JP | 2002-140731 | 5/2002 |
| JP | 2006-048278 | 2/2006 |
| JP | 2009-015583 | 1/2009 |
| WO | 03049455 | 6/2003 |
| WO | 2009117709 | 9/2009 |

OTHER PUBLICATIONS

Cipolla, R., et al., "Camera Calibration From Vanishing Points in Images of Architectural Scenes", University of Cambridge, Cambridge, UK, 1999, pp. 382-391.
Guillou, E., et al., "Using Vanishing Points for Camera Calibration and Coarse 3D Reconstruction from a Single Image", The Visual Computer, vol. 16, No. 7, 2000, pp. 396-410.
Chen, Shenchang Eric, "QuickTime VR—An Image-Based Approach to Virtual Environment Navigation", SIGGRAPH '95 Proceedings of the 22nd Annual Conference on Computer Graphics and Interactive Techniques, 1995, pp. 29-38.
Geng, Weidong et al., "Picture-Based Virtual Touring", The International Journal of Virtual Reality, vol. 4, No. 3, 2000, p. 1-13.
Uyttendaele, M., et al., "Image-Based Interactive Exploration of Real-World Environments", Computer Graphics and Applications, IEEE, vol. 24, No. 3, pp. 52-63, May-Jun. 2004.
Zhang, Qiushuang et al., "An Efficient Image-Based Virtual Tour System", Multi-Agent Security and Survivability, 2004 IEEE First Symposium, pp. 511-514, Dec. 2004.
Liu, Yixian et al., "Stage-Based 3D Scene Reconstruction from Single Image", 21st International Conference on Pattern Recognition, Nov. 11, 2012, pp. 1034-1037.
Nedovic, Vladimir, et al., "Depth Information by Stage Classification", Computer Vision 2007, IEEE 11th International Conference, Oct. 1, 2007, pp. 1-8.
Lee, D.C., "Geometric Reasoning for Single Image Structure Recovery", 2009 IEEE Conference on Computer Vision and Pattern Recognition; Jun. 20-25, 2009, pp. 2136-2143.
Iizuka, Satoshi, et al., "Efficiently Modeling 3D Scenes from a Single Image", IEEE Computer Graphics and Applications, IEEE Service Center, New York, NY, vol. 32, No. 1, Nov. 1, 2012, pp. 18-25.
Wang, Zhenyu, et al., "Depth Template Based 2D-to-3D Video Conversion and Coding System", 2012 IEEE International Conference on Multimedia and Expo, Jul. 9, 2012, pp. 308-313.
Barinova, Olga, et al., "Fast Automatic Single-View 3-d Reconstruction of Urban Scenes", Computer Vision ECCV 2008, Oct. 12, 2008, pp. 100-113.
Shesh, Amit, et al., "Peek-in-the-Pic: Flying Through Architectural Scenes from a Single Image", Computer Graphics Forum, vol. 27, No. 8, Dec. 1, 2008, pp. 2143-2153.
Kang, H.W., et al., "Tour Into the Picture using a Vanishing Line and its Extension to Panoramic Images", Eurographics, Cambridge, GB, vol. 20, No. 3, Jan. 1, 2001, pp. 1-11.
Wilczkowiak, Marta, et al., "Using Geometric Constraints through Parallelepipeds for Calibration and 3D Modeling", IEEE Transactions on Pattern Analysis and Machine Intelligence, vol. 27, No. 2, Feb. 1, 2005, pp. 194-207.
Horry, Y., et al., "Tour Into the Picture: Using a Spidery Mesh Interface to Make Animation from a Single Image", SIGGRAPH Computer Graphics Proceedings, Aug. 3, 1997, pp. 225-232.
Hoiem, D., et al., "Automatic Photo Pop-up", ACM Transactions on Graphics, vol. 24, No. 3, Jul. 1, 2005, pp. 577-584.
Ozaki, Nobuyuki, et al., "Development of a system that creates natural scene as a virtual world", The Virtual Reality Society of Japan Collected Papers, vol. 2, No. 2, Japan, Jun. 1997, pp. 1-8.

* cited by examiner

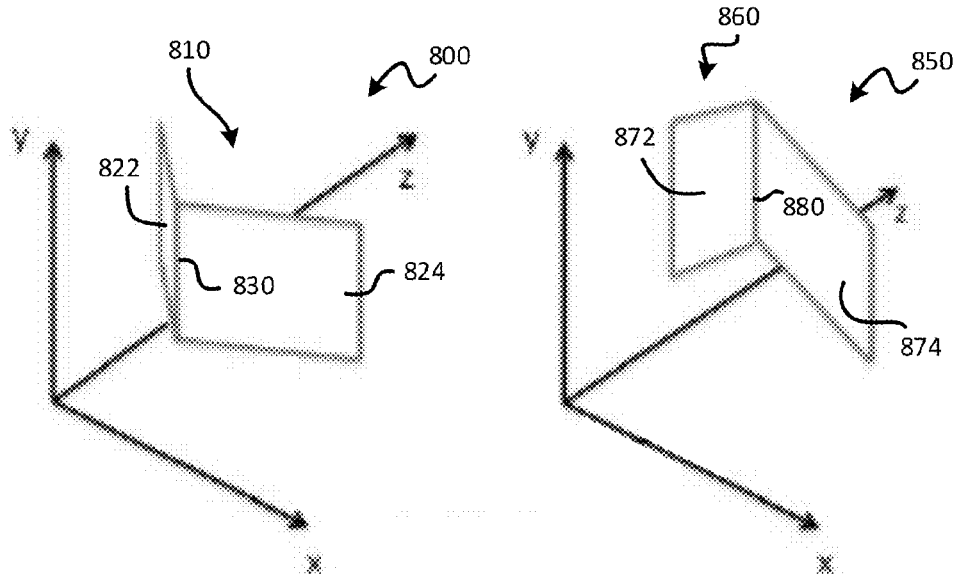
*Fig. 8A*              *Fig. 8C*
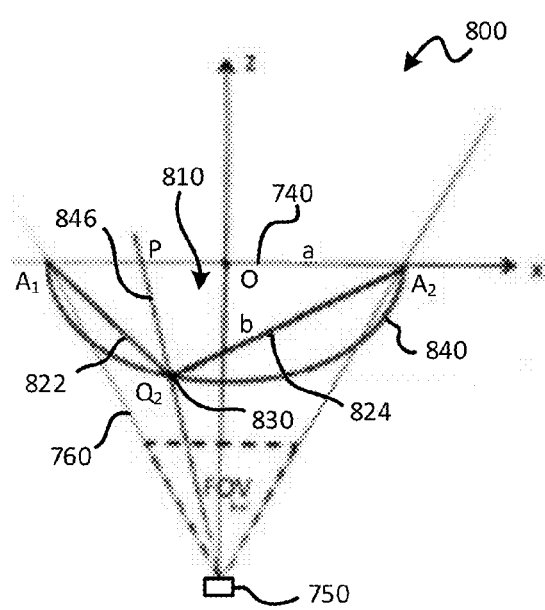
*Fig. 8B*              *Fig. 8D*

 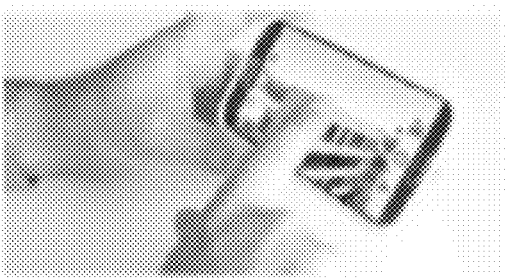
Taking a photo  Setting the main feature
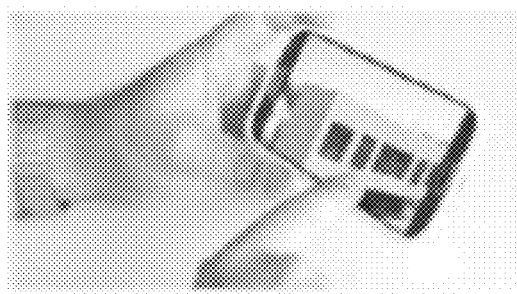 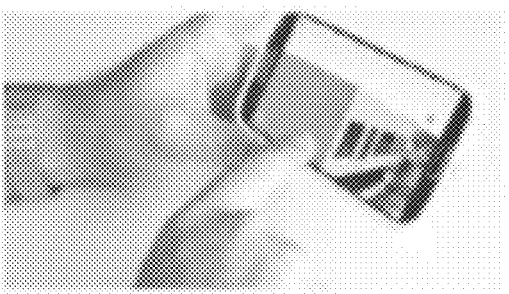
Enjoying the interactive immersive experience
*Fig. 19*

 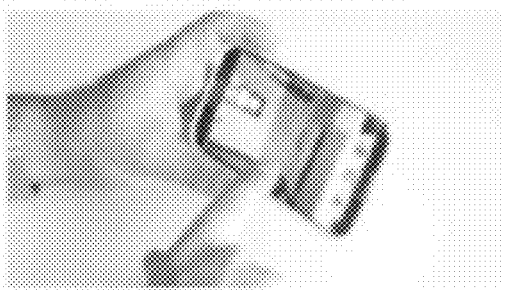 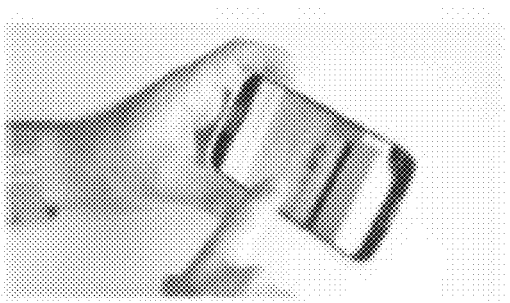
Fig. 20

Taking a photo
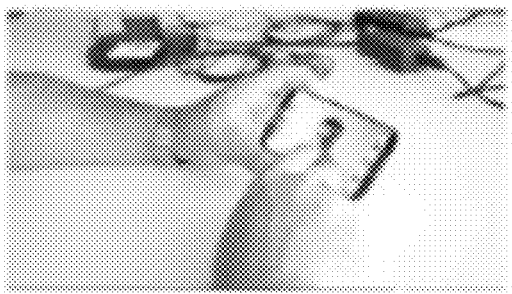
Setting the main feature
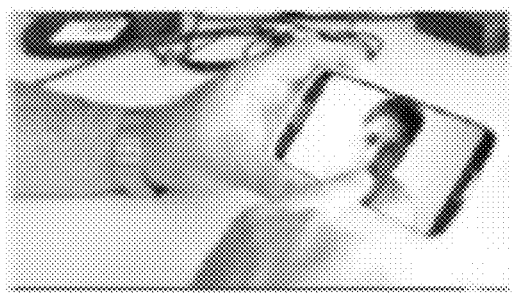
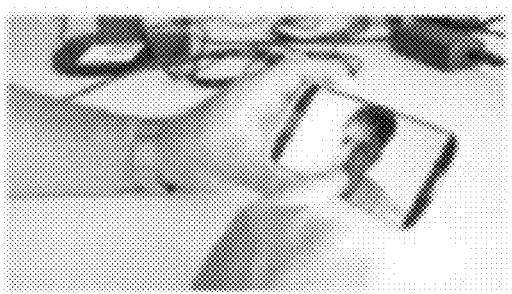
Enjoying the interactive immersive experience
*Fig. 21*

GENERATING A 3D INTERACTIVE IMMERSIVE EXPERIENCE FROM A 2D STATIC IMAGE

CROSS-REFERENCE TO RELATED APPLICATIONS

The present application claims priority from U.S. Provisional Application Ser. No. 61/872,969 for "Generating a 3D Interactive Immersive Experience From a 2D Static Image,", filed Sep. 3, 2013, which is incorporated herein by reference.

The present application is related to U.S. Utility application Ser. No. 13/226,695 for "Generating Three-Dimensional Virtual Tours from Two-Dimensional Images,", filed Sep. 7, 2011 and issued on Apr. 22, 2014 as U.S. Pat. No. 8,705,892, which is incorporated herein by reference.

TECHNICAL FIELD

The present disclosure relates to generation and presentation of an interactive immersive experience from a static image.

BACKGROUND

K. Anjyo, and K. Arai, "Tour Into the Picture: Using a Spidery Mesh Interface to Make Animation from a Single Image", SIGGRAPH' 97 Proceedings, pp. 225-232 (1997)) describes a technique wherein a user can remove foreground objects from a landscape photographic image, specify a vanishing point in the perspective and, using the specified vanishing point, estimate the general configuration of a scene for carrying out viewpoint movement.

Many techniques have been attempted to estimate the three-dimensional structure of a scene from a two-dimensional image. Most of these techniques follow the same general approach: estimating an image's perspective using calculated vanishing points, extracting textures of relevant objects in the scene and pasting them into a 3D model, while taking into account the perspective.

Some efforts have tried to minimize the calculations involved, such as the "Automatic photo pop-up" technique proposed by Derek Hoiem in 2002. The Hoiem technique is based on a pop-up book for children, in which a picture pops up when the book is opened. According to the technique, a 2D photographic image is divided into three parts: a ground area, a vertical area, and a sky area. The boundaries between the ground area and the vertical area in the image are estimated. Once the boundaries have been estimated as references, objects forming the 2D photographic image are cut and folded, thereby generating a 3D model.

Other efforts aim to improve the well-established methods. For instance, in U.S. Pat. No. 8,254,667, titled "Method, Medium And System Implementing 3D Model Generation Based On 2D Photographic Images", issued Aug. 28, 2012, a modeling system is implemented for object identification for object extraction.

One problem with many conventional 3D image creation methods is that it can be difficult to determine a vanishing point automatically, because estimating a structure's perspective is not always possible for all possible scenes. Furthermore, even when estimating a structure's perspective is feasible, it can be difficult to automatically compose a correct depth structure model for making the image naturally viewable as a 3D object.

Another issue is that many 3D images created using the above-described techniques deliver a poor user experience for the consumer market because the 3D images are not full images, but rather a 3D model with "holes" because of the textures that have been extracted. Such holes can detract from the experience by making the limitations of the 3D environment obvious.

SUMMARY

Various embodiments of the technology described herein provide an improved method for the creation of a 3D interactive immersive experience from a 2D image. The 2D image may be obtained in various ways, and in some embodiments may be captured by a digital camera operated by the user.

In at least one embodiment, a classification of the 2D image is identified, either manually by a user or automatically, for example by comparing the 2D image to a database of pre-classified image features. Once one or more image features are identified, the system may identify the image type as that of the identified image feature(s). This may entail determining which image type, of a plurality of image types, the 2D image most closely resembles. The image types may include, for example, the following six types:

An interior image type;
An exterior image type;
A corridor image type;
A people image type;
A landscape image type; and
An "other" image type.

These image types represent many of the 2D images that are likely to be captured and/or manipulated by a user. In other embodiments, other classifications can be used in addition to or in place of the foregoing.

In at least one embodiment, each of these classifications is associated with a predefined 3D main feature type that can be expected to appear within the 2D image. The main feature types may include, for example, the following types, which may correspond to the image types listed above, and may be defined by geometric elements as follows:

For a 2D image of the interior image type, a concave vertical corner defined by a vertical line;
For a 2D image of the exterior image type, a convex vertical corner defined by a vertical line;
For a 2D image of the corridor image type, a corridor defined by a rectangle that indicates boundaries of the corridor;
For a 2D image of the people image type, a face of a person defined by a rectangle that frames the face;
For a 2D image of the landscape image type, a concave horizontal corner defined by a horizontal line; and
For a 2D image of the "other" image type, no main feature may be defined.

In some embodiments, the image type may be selected by the user. This may be done, for example, by selecting the image type from a list. Then, a main feature of the image may be identified. This may be done, for example, by allowing the user to position the corresponding geometric element at the proper location on the 2D image.

Once the main feature has been identified, a 3D object may be built, using the main feature as a reference. If the 2D image is of the "other" image type, the 3D object may consist of the image plane; in at least one embodiment, no main feature is selected or used. For the other image types, multiple planes may be used, and may intersect on the line(s) or edge(s) of the corresponding main feature. A virtual camera may be created relative to the image plane in which the 2D image exists; the virtual camera may have a field of view bounded by the image plane.

More specifically, for the exterior image type and the interior image type, an ellipse may be created with a major axis on the image plane. Two planes may be created; each of the planes may intersect the major axis and the ellipse, and the two planes may also intersect at the main feature (i.e., the vertical corner).

For the corridor image type and the person image type, an ellipse may be created as set forth above. Three planes may be created. A first plane may intersect the major axis and the ellipse, and an edge of the rectangle used to frame or define the main feature. A second plane may intersect the first plane at the same edge, and may also intersect the opposite edge of the rectangle. A third plane may intersect the second plane at this same edge, and may also intersect the major axis and the ellipse.

For the landscape image type, a horizontal and a vertical plane may be created. They may intersect at the horizontal line that defines the main feature of the 2D image.

The 2D image may then be applied to the surfaces of the planes facing the virtual camera. This may complete the creation of a 3D object. The 3D object may be viewed through the virtual camera to generate a 3D view based on the 2D image. The 3D view may be displayed for the user, for example, on a display screen.

In at least one embodiment, the system may enable the user to control the position and/or orientation of the virtual camera. This may include ensuring the confinement of the virtual camera inside the 3D model so that only the 3D object is visible in the new 3D views that are generated. User input may be received to move the virtual camera, and prior to generating a new 3D view at the desired position and/or orientation, the system may first determine whether the new 3D view would be entirely occluded by the 3D object. Full occlusion of the 3D view by the 3D object may ensure that the 3D view has no blank spaces, holes, gaps, or other similar features that could otherwise detract from the user's sense of immersion in the 3D scene.

If the 3D view is fully occluded by the 3D object, the new 3D view may be generated and displayed for the user. If not, the system may wait for further user input, such as user input indicating a different virtual camera position and/or orientation, and then check again to determine whether the field of view is fully occluded by the 3D object. In this way, the user's sensation of immersion in the 3D scene may be retained.

BRIEF DESCRIPTION OF THE IMAGES

The accompanying drawings illustrate several embodiments. Together with the description, they serve to explain the principles of the embodiments. One skilled in the art will recognize that the particular embodiments illustrated in the drawings are merely exemplary, and are not intended to limit scope.

FIGS. 8A-8D illustrate how the 3D scene for an exterior and interior image type is constructed, according to one embodiment.

FIG. 19 illustrates implementation on a smartphone with a 2D image of the exterior type, following the procedures depicted in FIGS. 4 and 13, according to one embodiment.

FIG. 20 illustrates implementation on a smartphone with a 2D image of the interior type, following the procedures depicted in FIGS. 4 and 13, according to one embodiment.

FIG. 21 illustrates implementation on a smartphone with a 2D image of the people type, following the procedures depicted in FIGS. 4 and 13, according to one embodiment.

DETAILED DESCRIPTION

Figure 1A:
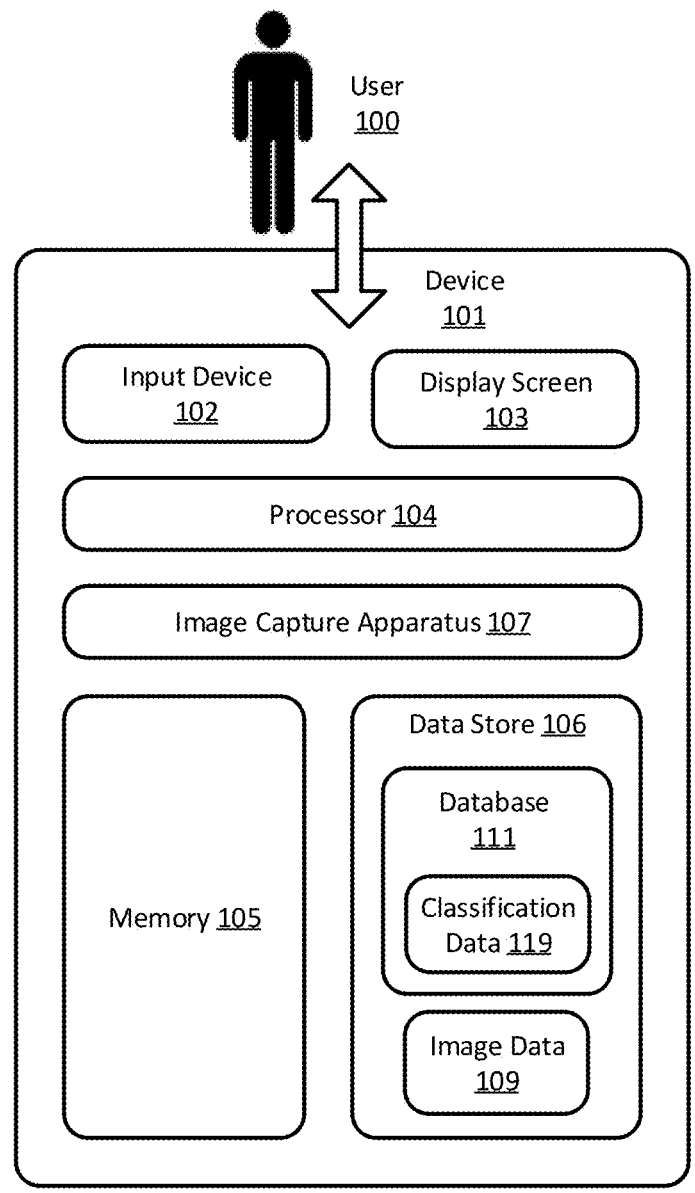
FIG. 1A is a block diagram depicting a hardware architecture according to one embodiment.

According to various embodiments, a three-dimensional (3D) view is generated from a two-dimensional (2D) image. Throughout the following description, the terms "image," "photo," "photograph," and "photographic image" may be used; however, one skilled in the art will recognize that the techniques described herein can be implemented using any still images and is not limited to photographs. Thus, references to "image", "photo", "photograph", and "photographic image" should be considered to include any still images, pictures, photographs, sketches, and the like.

In the description provided herein, the following terms are used:

A 2D image is any image, such as a photograph, that is encoded in a digital image file.

A 3D scene is a construct that defines positions and relationships, in 3D space, among two or more elements such as 3D objects, cages, and virtual cameras.

A virtual camera is a viewpoint within a 3D scene that is defined in terms of a focal length, position and orientation within the 3D scene. A 3D view for the user may be generated based on the position and orientation of the virtual camera.

A cage is a construct in 3D space that defines the range of permissible movement of the camera while viewing a 2D image.

A corner is a line at which two planar portions of a real object intersect, or at which two planes of a virtual object intersect.

A concave corner is a corner with adjoining planes or planar surfaces that extend toward the camera or virtual camera.

A convex corner is a corner with adjoining planes or planar surfaces that extend away from the camera or virtual camera.

A rectangle that frames an object is a rectangle that is placed generally around the perimeter of the object; the rectangle may be sized to circumscribe the object, or may be larger so as to leave a gap between the rectangle and the object.

In one embodiment, a 2D image is received and classified with one of a plurality of image types, either manually or automatically. A main feature of the 2D image may then be identified in accordance with the image type. The main feature may be used to generate a 3D object, which may be positioned in a 3D scene relative to a virtual camera. The 2D image may be applied to the surfaces of the 3D object that face the virtual camera. A 3D view of the 3D object may then be generated from the point of view of the virtual camera and displayed for the user. The user may optionally provide user input to move the virtual camera, with limits to ensure that only the 3D object is visible in the resulting 3D views.

System Architecture

According to various embodiments, the system can be implemented on any electronic device equipped to capture, receive, store, and/or present information such as images. Such an electronic device may be, for example, a camera, desktop computer, laptop computer, smartphone, tablet computer, or the like.

Although the system is described herein in connection with an implementation in a smartphone, one skilled in the art will recognize that the techniques described herein can be implemented in other contexts, and indeed in any suitable device capable of receiving and/or processing user input. Accordingly, the following description is intended to illustrate various embodiments by way of example, rather than to limit scope.

Referring now to FIG. 1A, there is shown a block diagram depicting a hardware architecture for practicing the described system, according to one embodiment. Such an architecture can be used, for example, for implementing the described techniques in a smartphone, camera, or other device 101. Device 101 may be any electronic device equipped to receive, store, and/or present information, and to receive user input in connection with such information.

In at least one embodiment, device 101 has a number of hardware components well known to those skilled in the art. Input device 102 can be any element that receives input from user 100, including, for example, a keyboard, mouse, stylus, touch-sensitive screen (touchscreen), touchpad, trackball, accelerometer, five-way switch, microphone, or the like. Input can be provided via any suitable mode, including for example, one or more of: pointing, tapping, typing, dragging, and/or speech.

Data store 106 can be any magnetic, optical, or electronic storage device for data in digital form; examples include flash memory, magnetic hard drive, CD-ROM, DVD-ROM, or the like. In at least one embodiment, data store 106 stores information which may include one or more databases, referred to collectively as a database 111, that can be utilized and/or displayed according to the techniques described below. In another embodiment, database 111 can be stored elsewhere, and retrieved by device 101 when needed for presentation to user 100. Database 111 may include one or more data sets, which may be used for a variety of purposes and may include a wide variety of files, metadata, and/or other data. In at least one embodiment, database 111 may include classification data 119. Image data 109 may also be stored in data store 106.

Display screen 103 can be any element that graphically displays information such as image data 109, items from database 111, and/or the results of steps performed on such items to provide information to a user. Such output may include, for example, 3D views generated from 2D images and related user interface elements. In some embodiments, such output may include data, metadata, data visualizations, 3D scene information, and/or the like. In at least one embodiment where only some of the desired output is presented at a time, a dynamic control, such as a scrolling mechanism, may be available via input device 102 to change which output is currently displayed, and/or to alter the manner in which the output is displayed.

In at least one embodiment, the information displayed on display screen 103 may include data in text and/or graphical form. Such data may include visual cues, such as height, distance, and/or area, to convey the value of each data entry. In at least one embodiment, user 100 can provide input, such as a selection from a menu containing a variety of options, to determine the various characteristics of the information presented such as the type, scope, and/or format of the information to be displayed on display screen 103.

Processor 104 can be a conventional microprocessor for performing operations on data under the direction of software, according to well-known techniques. Memory 105 can be random-access memory, having a structure and architecture as are known in the art, for use by processor 104 in the course of running software.

Data store 106 can be local or remote with respect to the other components of device 101. In at least one embodiment, device 101 is configured to retrieve data from a remote data storage device when needed. Such communication between device 101 and other components can take place wirelessly, by Ethernet connection, via a computing network such as the Internet, or by any other appropriate means. This communication with other electronic devices is provided as an example and is not necessary.

In at least one embodiment, data store 106 is detachable in the form of a CD-ROM, DVD, flash drive, USB hard drive, or the like. Data in database 111 can be provided from a source outside of device 101 into a data store 106 that is detachable, and later displayed after the data store 106 is connected to device 101. In another embodiment, data store 106 is fixed within device 101.

Image capture apparatus 107 may be designed to capture a 2D image of a scene proximate the device 101. Thus, the image capture apparatus 107 may be a digital camera or the like. The image capture apparatus 107 may include a CCD, CMOS, or any other sensor that receives light and, based on the light received, generates data. The image capture apparatus 107 may thus be used to capture the image data 109, which may be stored in the data store 106 as set forth previously.

Figure 1B:
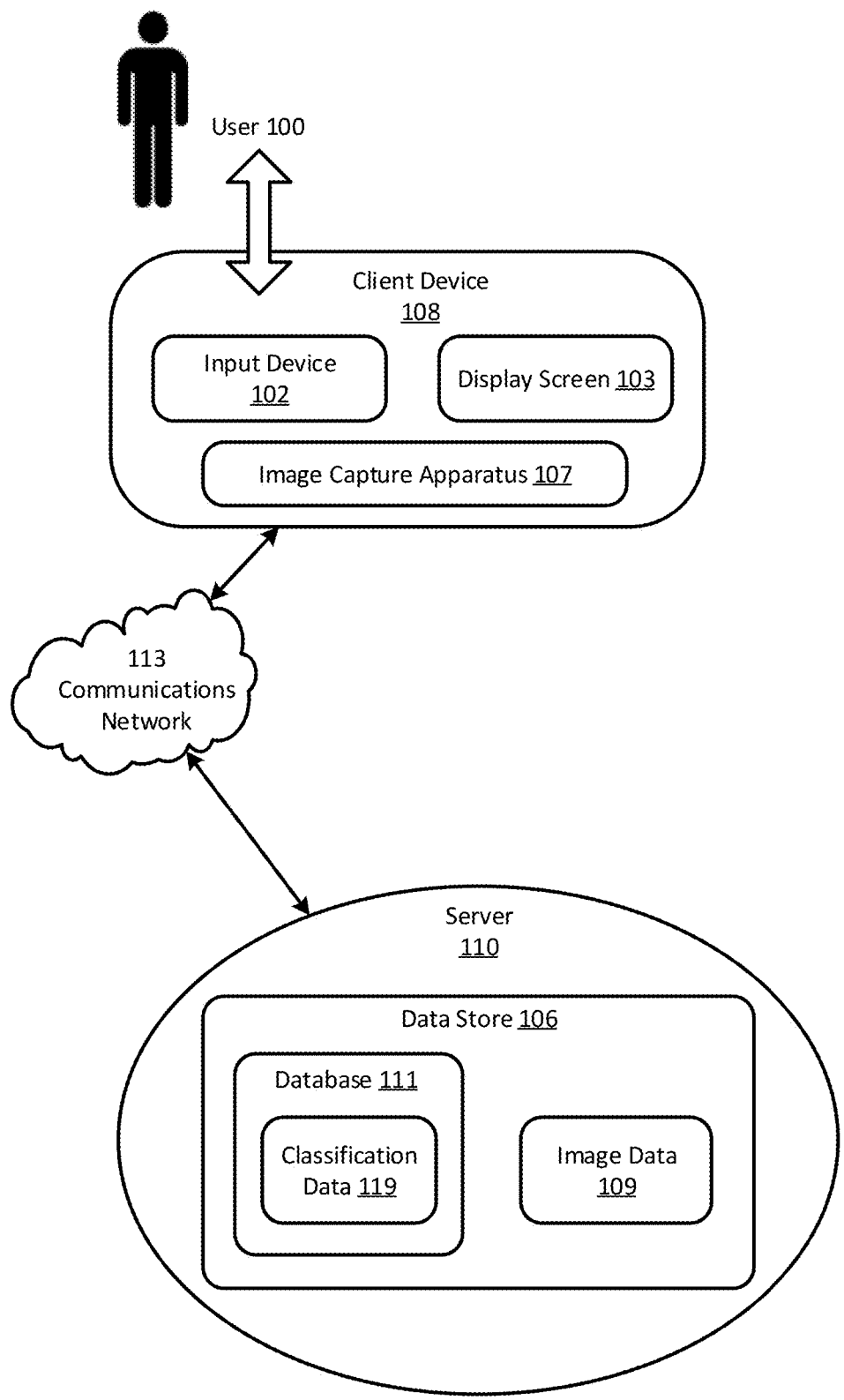
FIG. 1B is a block diagram depicting a hardware architecture in a client/server environment, according to one embodiment.

Referring now to FIG. 1B, there is shown a block diagram depicting a hardware architecture for a client/server environment, according to one embodiment. Such an implementation may use a "black box" approach, whereby data storage and processing are done completely independently from user input/output. An example of such a client/server environment is a web-based implementation, wherein client device 108 runs a browser that provides a user interface for interacting with web pages and/or other web-based resources from server 110. Items from the data store 106, reports, and/or other data derived from the data store 106 can be presented as part of such web pages and/or other web-based resources, using known protocols and languages such as Hypertext Markup Language (HTML), Java, JavaScript, and the like.

Client device 108 can be any electronic device incorporating the input device 102, display screen 103, and/or image capture apparatus 107, such as a desktop computer, laptop computer, personal digital assistant (PDA), cellular telephone, smartphone, music player, handheld computer, tablet computer, kiosk, game system, or the like. Any suitable type of wired and/or wireless communications network 113, such as the Internet, can be used as the mechanism for transmitting data between client device 108 and server 110, according to any suitable protocols and techniques. In addition to the Internet, other examples include cellular telephone networks, EDGE, 3G, 4G, long term evolution (LTE), Session Initiation Protocol (SIP), Short Message Peer-to-Peer protocol (SMPP), SS7, Wi-Fi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof. In at least one embodiment, client device 108 transmits requests for data via communications network 113, and receives responses from server 110 containing the requested data.

In this implementation, server 110 is responsible for data storage and processing, and incorporates data store 106 for storing database 111 and/or other data. Server 110 may include additional components as needed for retrieving data and/or database 111 from data store 106 in response to requests from client device 108.

In at least one embodiment, data store 106 may be organized into one or more well-ordered data sets, with one or more data entries in each set. Data store 106, however, can have any suitable structure. Accordingly, the particular organization of data store 106 need not resemble the form in which information from data store 106 is displayed to user 100.

In at least one embodiment, database 111 is organized in a file system within data store 106. Appropriate indexing can be provided to associate particular documents with particular quantitative data elements, reports, other documents, and/or the like. Database 111 may include any of a wide variety of data structures known in the database arts. As in FIG. 1A, database 111 may include one or more data sets, which may include classification data 119, and/or other data (not shown). Image data 109 may be stored in the data store 106.

Image data 109 may be captured and provided by image capture apparatus 107. In at least one embodiment, input device 102 is configured to receive data entries from user 100, to be added to data store 106. User 100 may provide such data entries via the hardware and software components described above according to means that are well known to those skilled in the art. According to some embodiments, the user 100 may use the input device 102 to enter classification data 119 and/or make selections to control generation of the 3D view from the 2D image.

The server 110 may be connected to several client devices 108 that are used by various individuals of an enterprise, government entity, school, web-accessible subscription service, or other organization, and may thus store image data 109 and/or classification data 119 from multiple users and/or multiple client devices 108.

Display screen 103 can be any element that graphically displays information such as 3D views generated from 2D images and related user interface elements. In some embodiments, such output may include data, metadata, data visualizations, 3D scene information, and/or the like. In at least one embodiment where only some of the desired output is presented at a time, a dynamic control, such as a scrolling mechanism, may be available via input device 102 to change which output is currently displayed, and/or to alter the manner in which the output is displayed.

Processor 104 can be a conventional microprocessor for performing operations on data under the direction of software, according to well-known techniques. Memory 105 can be random-access memory, having a structure and architecture as are known in the art, for use by processor 104 in the course of running software. Image capture apparatus 107 may optionally be a digital camera, as set forth in the description of FIG. 1A. Image data 109 provided by the image capture apparatus 107 may be stored at a location remote from the device 101, such as in the server 110. Additionally or alternatively, in some embodiments, multiple computing devices may be used to a 3D view from a 2D image. For example, a client device 108 (such as a smartphone or digital camera) may be used to capture the image data 109, which may then be uploaded to a different device (such as a computer), which may generate the 3D view.

In one embodiment, the system can be implemented as software written in any suitable computer programming language, whether in a standalone or client/server architecture. Alternatively, it may be implemented and/or embedded in hardware.

Data Structures

In general, the data stored within the data store 106 of FIG. 1A or FIG. 1B may include image data 109 and/or classification data 119, which may be encoded using any suitable format.

Figure 2A:
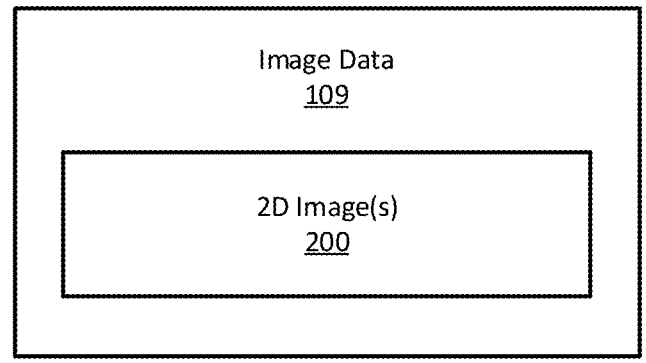
FIG. 2A is a block diagram depicting image data that may be recorded according to one embodiment.

Referring to FIG. 2A, a block diagram illustrates the image data 109 in greater detail. The image data 109 may include one or more 2D images 200. The 2D images 200 may be captured by device 101 and/or client device 108, for example, through the use of image capture apparatus 107. Alternatively, the 2D images 200 may be received from another source and stored in the data store 106.

Figure 2B:
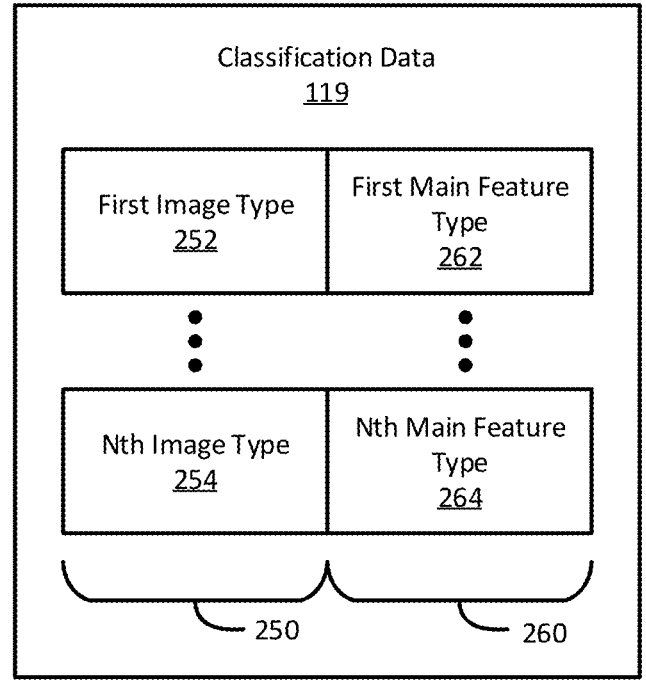
FIG. 2B is a block diagram depicting various types of classification data that may be recorded according to one embodiment.

Referring to FIG. 2B, a block diagram illustrates the classification data 119 in greater detail. The classification data 119 may include information needed to classify the 2D images 200 and/or identify main features to facilitate construction of a 3D environment. The classification data 119 may include a variety of data useful to classify images and/or features.

The classification data 119 may optionally include one or more image types 250 and one or more main feature types 260. The image types 250 may indicate the subject matter of the corresponding 2D image, such as whether the 2D image shows people, places, objects, or the like. As will be discussed subsequently, the image types 250 may optionally include the following:

- An interior image type;
- An exterior image type;
- A corridor image type;
- A people image type;
- A landscape image type; and
- An "other" image type.

The image types 250 may include a first image type 252 and optionally, one or more additional image types, up to an nth image type 254. The main feature types 260 may include a first main feature type 262 and optionally, one or more additional main feature types, up to an nth main feature types 264.

Each of the main feature types 260 may be associated with one of the image types 250. Thus, the first main feature type 262 may be associated with the first image type 252, up to the nth main feature type 264, which may be associated with the nth image type 254. If desired, the image types 250 and the main feature types 260 may be arranged in a lookup table or the like, so that an image type of the image types 250 can be looked up to obtain the appropriate main feature type of the main feature types 260. In one embodiment, the main feature types may include the following:

- For a 2D image of the interior image type, a concave vertical corner defined by a vertical line;
- For a 2D image of the exterior image type, a convex vertical corner defined by a vertical line;
- For a 2D image of the corridor image type, a corridor defined by a rectangle that indicates boundaries of the corridor;
- For a 2D image of the people image type, a face of a person defined by a rectangle that frames the face;
- For a 2D image of the landscape image type, a concave horizontal corner defined by a horizontal line; and
- For a 2D image of the "other" image type, no main feature may be defined.

The classification data 119 may be predetermined and provided with the software application. Additionally or alternatively, the classification data 119 may be provided and/or customized by the user. If desired, the classification data 119 may be customized based on the type of 2D images likely to be processed to make 3D views. The classification data 119 may optionally include other data in addition to or in place of the image types 250 and/or the main feature types 260.

According to some alternative embodiments, the classification data 119 may include data regarding other image parameters, such as brightness, contrast, location, average color value, depth of field, lens type, or the like. Such data may, for example, be used to help the computing device 101 or the client device 108 to infer an image type of the 2D image 200 without explicit user input regarding the image type. If desired, image recognition algorithms or the like may be used to make this determination, with the aid of the classification data listed above and/or the raw image data of the 2D image.

3D View Generation from 2D Image

In one embodiment, the system generates a 3D view from a 2D image. The 3D view may present the impression of immersion in the environment in which the 2D image was captured. This may be accomplished by creating a 3D object based on a main feature of the 2D image, as will be described in greater detail subsequently. Optionally, user input may be received to generate additional 3D views, which may optionally be displayed for the user 100 in rapid succession to emulate motion relative to the 3D object.

Figure 3:
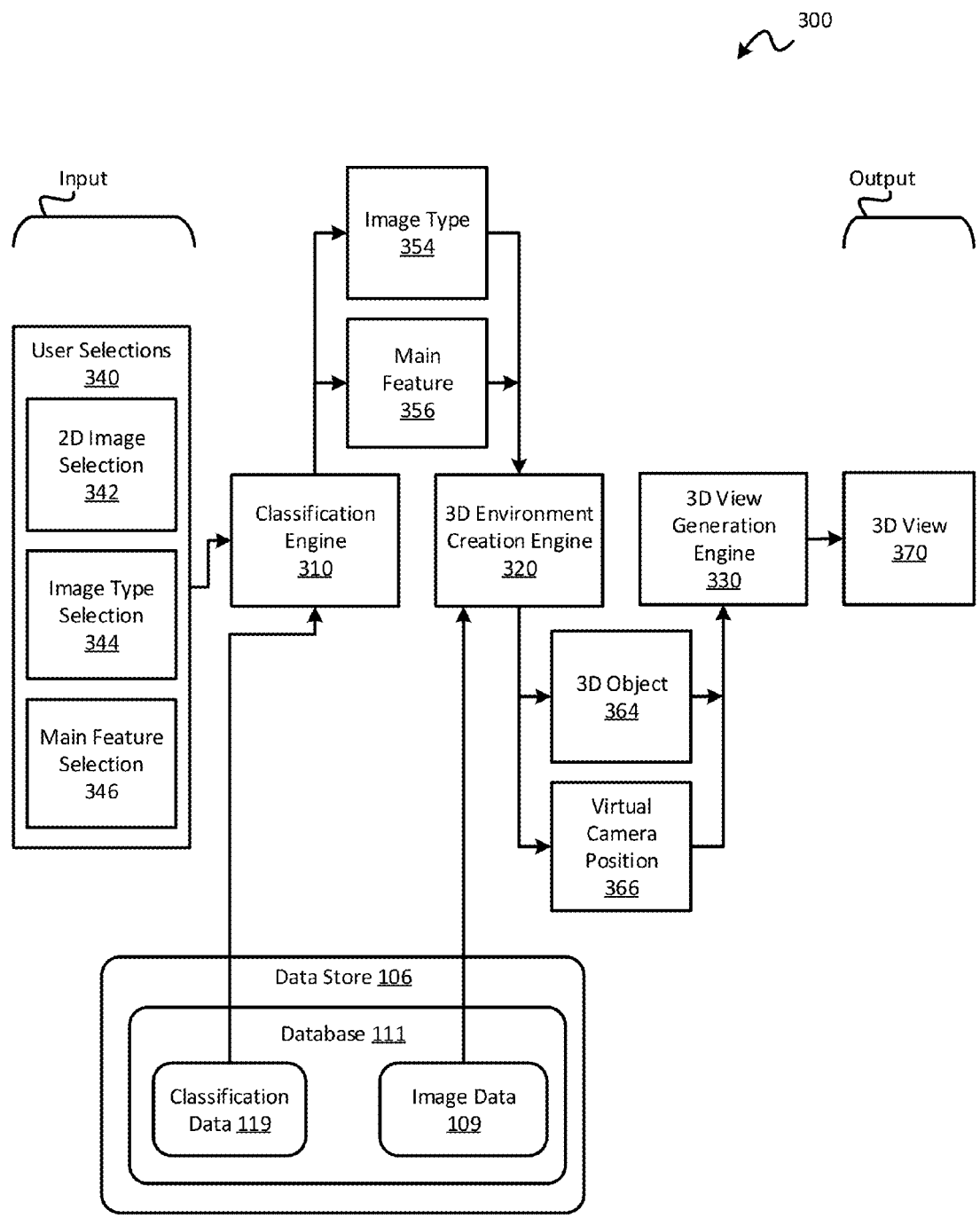
FIG. 3 is a block diagram depicting a system for generating a 3D view from a 2D image according to one embodiment.

Referring to FIG. 3, a schematic block diagram illustrates a system 300 for generating 3D views from 2D images, according to one embodiment. The system 300 may include modules that are implemented by one or more of the components of FIGS. 1A and/or 1B.

As shown, the system 300 may include a classification engine 310 that enables classification of the 2D image 200, a 3D environment creation engine 320 that creates a 3D environment based, at least in part, on the output of the classification engine 310, and a 3D view generation engine 330 that uses the 3D environment created by the 3D environment creation engine 320 to generate the desired 3D view.

The classification engine 310 may receive input from the user, which may take the form of user selections 340. The user selections 340 may optionally include a 2D image selection 342, an image type selection 344, and/or a main feature selection 346. The 2D image selection 342 may be a selection of a 2D image 200 of the 2D images 200 from which the 3D view is to be generated. In the event that only one 2D image 200 is stored in the image data 109, no explicit user input may be needed to provide the 2D image selection 342.

The classification engine 310 may be designed to provide an image type 354 of the image types 250 based on the image type selection 344. Similarly, the classification engine 310 may be designed to provide a main feature 356 of the main feature type 260 corresponding to the image type 354, which may be based on the main feature selection 346. The image type selection 344 and/or the main feature selection 346 may optionally be provided by the user, for example, via the input device 102.

In alternative embodiments, the image type selection 344 and/or the main feature selection 346 may be automatically determined, for example, with image recognition algorithms or the like. Such image recognition algorithms need not necessarily identify specific items depicted in the 2D image 200; rather identifying geometric features such as edges, surfaces, and the like may be sufficient.

Returning to the embodiment in which the image type selection 344 and the main feature selection 346 are provided to the system 300 via user selection, the system 300 may, for example, first receive the 2D image selection 342, by which the user 100 selects the 2D image 200 for which a 3D view is to be generated. This may be done, for example, by browsing the 2D images 200 stored in the data store 106 and selecting one of them for processing. Then, the user 100 may provide the image type selection 344, for example, from a list of the image types 250. The user 100 may provide the main feature selection 346 by positioning a graphical element such as a line, rectangle, or the like, on the main feature of the 2D image. If desired, the user 100 may be able to move, scale, and/or change the aspect ratio of such a graphical element in order to cause it to fit the shape of the main feature to be selected.

The 3D environment creation engine 320 may receive the image type 354 and the main feature 356 provided by the classification engine 310, and may use them to create a 3D environment or 3D scene. For example, the main feature may be used to define the geometry of a 3D object 364. The 3D object 364 may be positioned relative to a virtual camera position 366 of a virtual camera in the 3D environment.

The 3D object 364 may have any of a wide variety of shapes, including planar and non-planar shapes. Thus, the 3D object 364 may be defined through the use of any of a wide variety of constructs known in the 3D modeling, rendering, and animation arts, including but not limited to planes, primitives, shapes made via Boolean operations, extruded shapes, rotated shapes, splines, Bezier surfaces, non-uniform rational basis splines (NURBS), and the like. According to some embodiments, the 3D object 364 may have a very simple design with a small number of surfaces. Such a simple design may expedite rendering and enable the creation of smooth animation, "on the fly," within the 3D environment.

Thus, the 3D object 364 may include two or more planes that intersect on the main feature, which may have the shape of a line, rectangle, or the like. The 3D object may be sized such that it entirely occludes the field of view of the virtual camera at the virtual camera position 366. Once the geometry of the 3D object 364 has been defined, the 2D image 200 may be applied to the surfaces of the 3D object 364 that are oriented toward the virtual camera position 366. This may be done through the use of any of a wide variety of processes known in the 3D modeling, rendering, and animation arts. Any known texture mapping technique may be used. Such texture mapping techniques may apply the 2D image 200 to the 3D geometry as a flat cover (i.e., like a wallpaper). Additionally or alternatively, such texture mapping techniques may provide actual texturing (for example, by adding bumps to the 3D geometry) or the appearance of texturing (for example, by adding shadows at the appropriate locations to simulate the appearance of surface irregularities). Additionally or alternatively, other effects such as full or partial transparency, self-illumination, or the like may be used.

The 3D environment may optionally include other elements known in the 3D modeling, rendering, and/or animation arts, such as light sources. In lieu of light sources, the 3D environment may simply be rendered through the use of one or more ambient lighting parameters. If desired, the lighting applied to the 3D environment may be adjustable by the user.

The 3D view generation engine 330 may receive the 3D environment, which may include the 3D object 364 and the virtual camera position 366, and may create a 3D view 370 based on the 3D environment. This may entail rendering the 3D scene from the point of view of the virtual camera position 366. Any of a wide variety of rendering techniques may be applied, as known in the 3D modeling, rendering, and/or animation arts. If desired, the virtual camera position 366 may also include one or more additional parameters for the virtual camera, such as the width and/or height of the associated field of view of the virtual camera. Rendering the 3D scene may take such parameters into account.

The 3D view 370 may be displayed for the user, for example, on the display screen 103. The geometry of the 3D scene may help the user 100 to perceive depth in the resulting 3D view 370. This sense of depth may be enhanced by repositioning the virtual camera, thus providing a new virtual camera position 366, and rendering the 3D scene again from the new virtual camera position 366. This may be done one or more times. If the resulting 3D views 370 are displayed in relatively rapid succession, the user 100 may have the impression that he or she is moving within the 3D scene.

Such virtual camera repositioning may be done automatically. For example, the system 300 may move the virtual camera in any of a variety of predetermined camera pathways, relative to the 3D object 364. Such predetermined camera pathways may be established with reference to the image type 354 and/or the main feature 356. Thus, for example, the system 300 may automatically move the virtual camera along a corridor for a 2D image 200 of the corridor image type to simulate motion along the corridor. For 2D image 200 of the exterior image type, the system 300 may move the virtual camera along a pathway that at least partially encircles the convex vertical corner to simulate walking around the corner. More complex motion pathways may be used for the virtual camera, and may include variations in the rate of motion of the virtual camera (for example, to simulate accelerating along the virtual camera pathway at the beginning of the animation, and decelerating to a stop at the end of the virtual camera pathway).

Additionally or alternatively, such virtual camera repositioning may be done according to input provided by the user 100. The user 100 may choose a virtual camera animation pathway from a number of pathways, or may select the motion of the virtual camera in other ways. For example, the user 100 may touch the display screen 103 to move the virtual camera toward his or her finger or may use a mouse or arrow keys to provide such input. The resulting display of 3D views 370 may be generated all at once after user input is received. Additionally or alternatively, the display of 3D views 370 may occur in real time as the user 100 provides input to move the virtual camera. Such real time responsiveness may enhance the sense of immersion in the 3D scene experienced by the user 100. The user 100 may effectively be able to walk or fly through the 3D scene, with immediate response to changes in the position of the virtual camera. Other forms of user interaction with the 3D scene may also be implemented.

Figure 4:
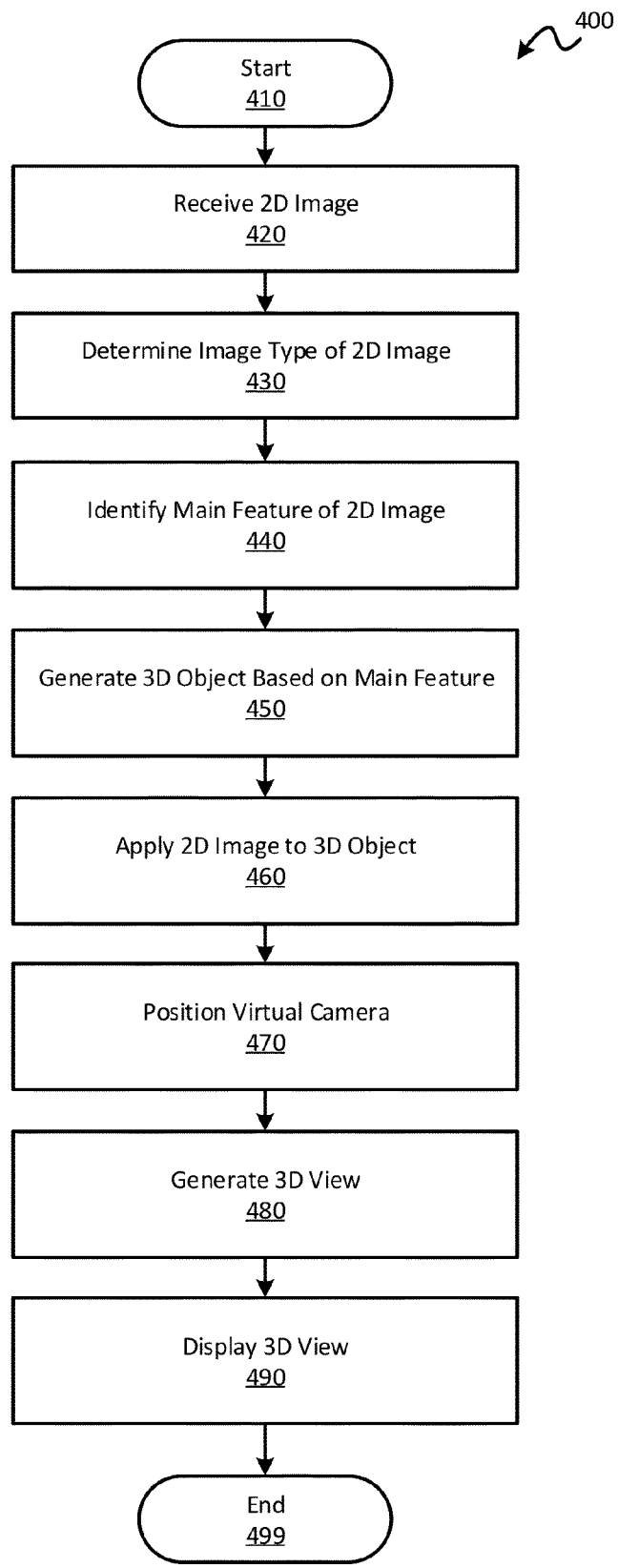
FIG. 4 is a flow diagram illustrating a method of converting a 2D image into a 3D image according to an embodiment.

Referring to FIG. 4, a flow diagram illustrates a method 400 for generating a 3D view, such as the 3D view 370, from a 2D image, such as the 2D image 200, according to one embodiment. The following description of the method 400 will be provided with reference to the system 300 of FIG. 3. However, in alternative embodiments, the method 400 may be performed with a variety of differently-configured systems. Further, in alternative embodiments, the system 300 may be used to carry out a variety of methods in addition to or in place of the method 400 of FIG. 4.

As shown, the method 400 may start 410 with a step 420 in which the 2D image 200 is received. As mentioned previously, this may involve capture of the 2D image 200 by the user 100 via image capture apparatus 107 at device 101 and/or client device 108. Additionally or alternatively, the step 420 may involve selection of one of multiple 2D images 200 stored in the data store 106. In some embodiments, the step 420 may involve receipt of the 2D image 200 from another computing system. For example, a 2D image 200 embedded in a web site or document may be used by the system 300. Additionally or alternatively, a 2D image 200 may be attached to and/or embedded in an e-mail, a text message, or other communications between users. Any such 2D images 200 may be selected by the user 100 and/or automatically selected for processing by the system 300.

The method 400 may then proceed to a step 430 in which the image type 354 of the 2D image 200 is determined. This may be done automatically or via user input, as set forth in the description of FIG. 3. The image type 354 may, for example, be selected from multiple options, which may include the image types 250 stored in the data store 106. If the image type 354 is determined based on user input (for example, receipt of the image type selection 344 as described in connection with FIG. 3), the image type selection 344 may be provided via selection from a menu or the like.

The method 400 may then proceed to a step 440 in which the main feature 356 of the 2D image 200 is identified. This may also be done automatically or via user input, as set forth in the description of FIG. 3. The main feature type 260 associated with the image type 354 may be applied to the 2D image 200 to identify the main feature. If the main feature 356 is identified based on user input (for example, receipt of the main feature selection 346 as described in connection with FIG. 3), the main feature selection 346 may be provided via user placement of a graphical tool or the like, with a shape that matches the main feature type 260 associated with the image type 354. Such a graphical tool may be placed on the main feature 356 to select the main feature 356.

The method 400 may then proceed to a step 450 in which the 3D object 364 is generated. This may be done in a variety of ways, which may depend on the image type 354. Examples of generation of the 3D object 364 will be provided hereafter.

The method 400 may then proceed to a step 460 in which the 2D image 200 is applied to the 3D object 364. As mentioned in the description of FIG. 3, this may be done using known texture mapping techniques. If desired, the 2D image 200 may be projected on the 3D object 364.

The method 400 may then proceed to a step 470 in which the virtual camera is positioned. As described previously, the virtual camera may be positioned such that the 3D object 364 occludes the entire field of view of the virtual camera. The step 470 may alternatively be carried out prior to the step 450 and the step 460 such that the virtual camera is positioned prior to creation of the 3D object 364.

The method 400 may then proceed to a step 480 in which the 3D view 370 is generated. As described in connection with FIG. 3, this may entail rendering the 3D scene form the point of view of the virtual camera. The result may be a two-dimensional image that helps to illustrate the dimensional aspect of the 2D image 200.

The method 400 may then proceed to step 490 in which the 3D view 370 is displayed for the user 100. As mentioned previously, this may involve display of the 3D view 370 on the display screen 103.

After the 3D view 370 has been displayed for the user 100, the method 400 may end 499. This may be the case if only one 3D view 370 is to be provided. However, if the user 100 is to have the ability to reposition the virtual camera and view one or more additional 3D views 370 as described above, the method 1300 of FIG. 13 may commence once the method 400 is complete.

Image Types

As mentioned previously, the image types 250 may be used to categorize the 2D images 200 according to their subject matter and/or contents. The image types 250 may include an interior image type, an exterior image type, a people image type, a corridor image type, a landscape image type, and an "other" image type. Examples of these, along with their corresponding main features, will be shown and described in connection with FIG. 5. One skilled in the art will recognize that other image types may be provided.

Figure 5:
FIG. 5 is an illustration of a classification taxonomy according to one embodiment. Where applicable, the main feature in each image is highlighted for illustrative purposes.

Referring to FIG. 5, a classification taxonomy 500 illustrates examples of 2D images 200 according to one embodiment. The 2D images 200 may be classified, for example, based on the main feature 356 present in each of the 2D images 200.

For example, in the interior image type, the main feature 356 may be a vertical concave corner 510, which may be defined by a vertical line. In the exterior image type, the main feature 356 may be a vertical convex corner 520, which may also be defined by a vertical line. Note that a "vertical line" is vertical relative to the main feature involved, but may not appear vertical when viewed in the 2D image 200.

In the people image type, the main feature 356 may be the face 530 of a person, which may be defined by a rectangle. In the corridor image type, the main feature 356 may be boundaries 540 of the corridor, which may also be defined by a rectangle. Note that a "rectangle" is rectangular relative to the actual main feature involved, but may not appear rectangular when viewed in the 2D image 200.

In the landscape image type, the main feature 356 may be an intersection 550 between a background and a floor (for example, a horizon line or an intersection between mountains and the ground), which may be defined by a horizontal line. Note that a "horizontal line" is horizontal relative to the main feature involved, but may not appear horizontal when viewed in the 2D image 200.

The "other" image type may apply to any 2D image 200 that does not fall into any of the other image types. The "other" image type may not have an associated main feature 356.

One skilled in the art will recognize that any suitable classification taxonomy can be used, with any number of types or classifications. The classification taxonomy 500 of FIG. 5, in which six types are available, is merely exemplary.

Figure 6:
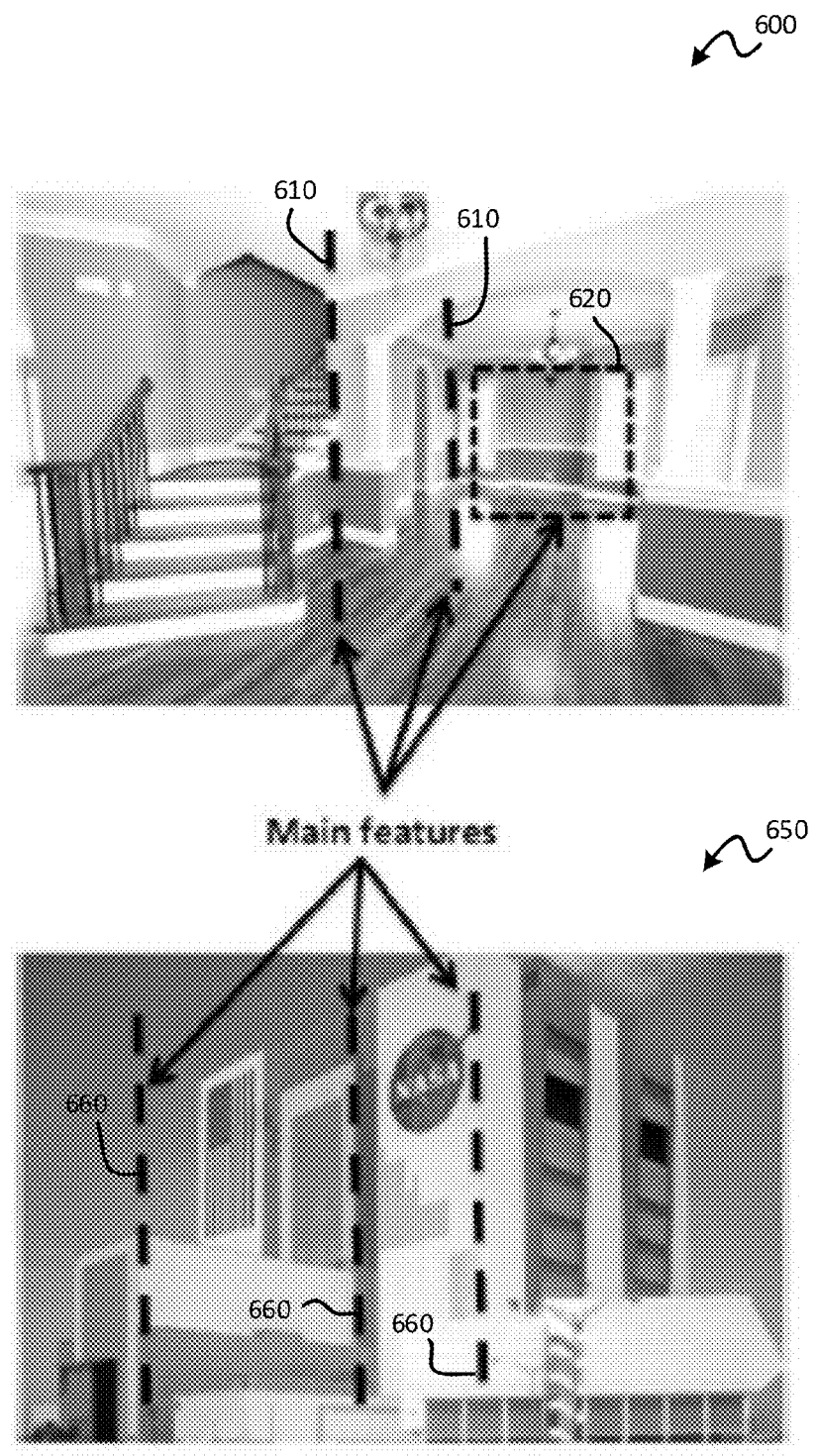
FIG. 6 illustrates examples of images in which the main features are not clear. This highlights situations where it can be difficult to classify an image.

Referring to FIG. 6, a first example 600 and a second example 650 illustrate some examples of 2D images in which multiple features may be selected as a main feature. More specifically, the first example 600 shows multiple vertical concave corners 610 and a boundary 620 of a corridor, any of which may be chosen as a main feature. The second example 650 shows multiple vertical convex corners 660, any of which may be chosen as a main feature.

In such 2D images 200, the classification may be made based on a single main feature. Thus, for example, only the boundary 620 or only one of the vertical concave corners 610 of the first example 600 may be chosen as a main feature. The first example 600 may be classified as an interior image or a corridor image. Similarly, only one of the vertical convex corners 660 may be chosen as the main feature of the second example, 650. The second example 650 may be classified as an exterior image. The remaining, unselected features of a 2D image 200 may be ignored during classification, so as to avoid errors that can otherwise be introduced when classifying the 2D image.

Figure 7:
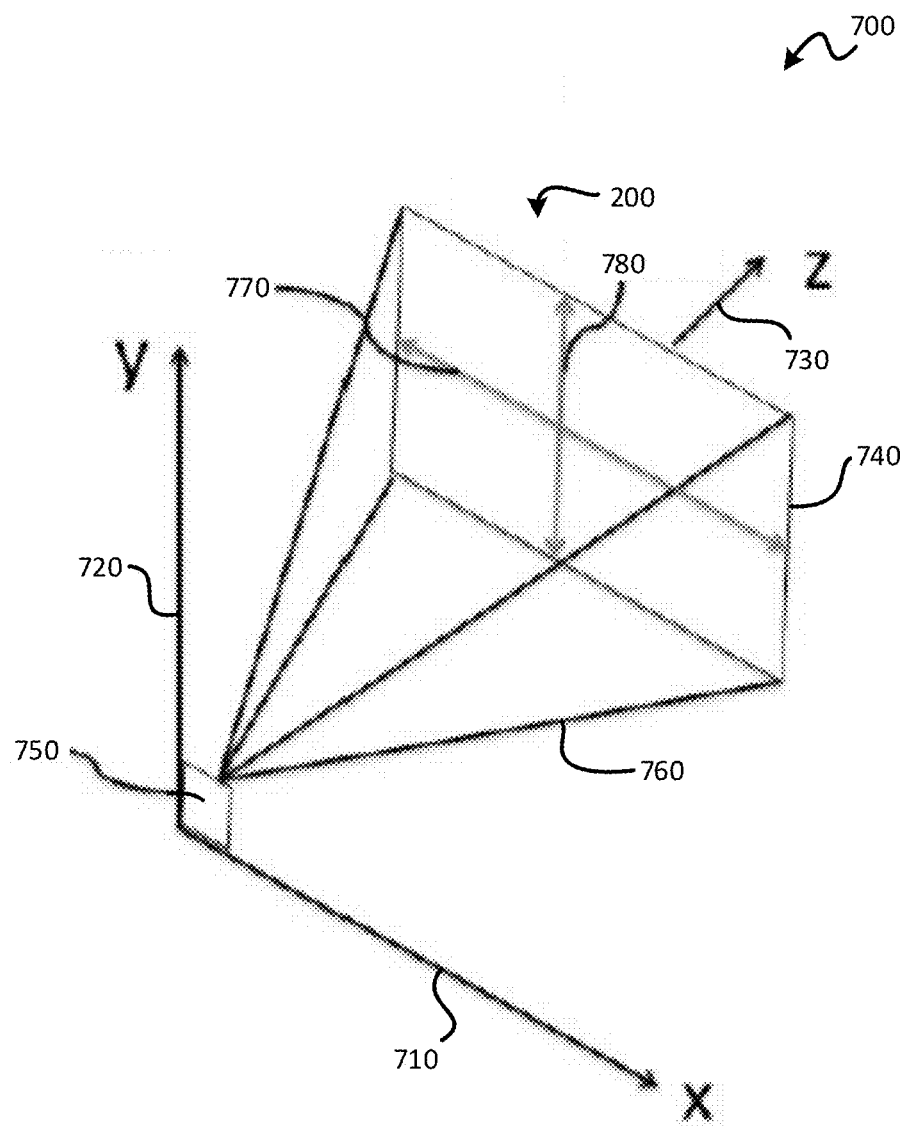
FIG. 7 illustrates the 3D system and how the 2D image is positioned around it, according to one embodiment.

FIG. 7 shows a 3D spatial system, or system 700, used in one embodiment for creating the 3D scene. The system 700 may have an X axis 710 representing a generally horizontal direction, a Y axis 720 representing a generally vertical direction, and a Z axis 730 representing horizontal depth relative to a 2D image 200. Within the system 700, the 2D image 200 may reside in an image plane 740.

The system 700 may also include a virtual camera 750, which may have a field of view 760 with a horizontal dimension 770 and a vertical dimension 780. As shown in FIG. 7, the 2D image 200 may be positioned based on the parameters of the virtual camera 750 in such a way that the field of view 760 covers the entire 2D image 200. For this embodiment, the parameters of the virtual camera 750 may be the same as those used to capture the 2D image 200. Thus, the parameters of the virtual camera 750 may mirror those of an actual camera that captured the 2D image 200, if the 2D image 200 is a photograph.

FIGS. 8A-8D, FIGS. 9A-9B, FIGS. 10A-10B, FIGS. 11A-11B, and FIGS. 12A-12B depict six different types of 3D scene into which a 2D image can be converted, according to one embodiment. The various scenes of these drawings may be associated with the various image types of the classification taxonomy 500 of FIG. 5. In each case, a 3D scene may be constructed within a 3D system where the 2D image 200 is perpendicular to the XZ plane (the plane defined by the X axis 710 and the Y axis 720, with reference to FIG. 7). In addition, each 3D scene may be based on the parameters of the associated virtual camera 750, which may include field of view and focal distance. These parameters may (but need not) coincide with those of the actual physical camera used to capture the 2D image 200, if the 2D image is a photograph.

Referring to FIGS. 8A and 8B, perspective and plan views, respectively, illustrate a 3D scene 800 associated with a 2D image 200 with the exterior image type. As shown in FIGS. 8A and 8B, the 3D scene 800 may include the virtual camera 750 and a 3D object 810, which may be an example of a 3D object 364 as discussed in the description of FIG. 3. The 3D object 810 may include a first plane 822 and a second plane 824, which may intersect with one another at a line 830. The first plane 822 and the second plane 824 may both be perpendicular to the XZ plane. The line 830 may be aligned with the vertical convex corner 520 that is the main feature 356 of the 2D image 200.

Thus, the resulting 3D view 370 may appear to bend around the vertical convex corner 520. The first plane 822 and the second plane 824 may each be sized to occlude (i.e., cover) the entire vertical dimension 780 of the field of view 760 of the virtual camera 750. Additionally, the first plane 822 and the second plane 824, combined, may be sized to occlude the entire horizontal dimension 770 of the field of view 760. Thus, the 3D object 810 may entirely occlude the field of view 760 so that, from the point of view of the virtual camera 750, only the 3D object 810 is visible. For the correct perspective correction, the horizon line may cross the orthocenter of the resulting 3D view 370, and the orthocenter may be in the center of the 3D view 370. This may be the case with all of the 3D scenes of FIGS. 8A-8D, FIGS. 9A-9B, FIGS. 10A-10B, FIGS. 11A-11B, and FIGS. 12A-12B.

FIG. 8B illustrates how the 3D object 810 may be created. In one embodiment, an ellipse 840 may be formed. Only half of the ellipse 840 is shown in FIG. 8B for clarity; only the convex half of the ellipse 840 may be needed to define the positions and orientations of the first plane 822 and the second plane 824. The size of the ellipse 840 may be determined by the parameters of the virtual camera 750 and/or the physical camera used to capture the 2D image 200. These parameters may include the field of view 760 (with reference to the virtual camera 750) and the focal distance.

More specifically, the ellipse 840 may have a major axis (denoted "a") positioned on the image plane 740, and a minor axis (denoted "b") perpendicular to the image plane 740. The major axis a may intersect the vertical edges of the image plane 740, thus intersecting the vertical edges of the field of view 760, to define a first intersection $A_1$ and a second intersection $A_2$, each of which may be a vertical line, which may appear as a point in FIG. 8B because $A_1$ and $A_2$ are perpendicular to the XZ plane. The ellipse 840 may pass through $A_1$ and $A_2$; thus, the focal distance and field of view of the virtual camera 750 may determine the length of the ellipse 840. The width of the ellipse 840, i.e., the length of the minor axis b, may be a fraction of that of the major axis a. In some embodiments, the length of the minor axis b may be within the range of ¼ of the length of the major axis a, to ½ of the length of the major axis a.

The first plane 822 may intersect the first intersection $A_1$ and the second plane 824 may intersect the second intersection $A_2$. In addition, the first plane 822 may intersect the second plane 824 at the line 830 as indicated above. The line 830 may also be located on the ellipse 840, at a point $Q_2$ (in the plan view of FIG. 8B). The point $Q_2$ may be located by drawing a ray 846 from the virtual camera 750 to the location P on the image plane 740 at which the vertical line defining the main feature 356 in the 2D image 200 has been placed. The ray 846 may intersect the ellipse 840 at the point $Q_2$. Thus, the position and orientation of each of the first plane 822 and the second plane 824 may be fully defined relative to the virtual camera position 366 of the virtual camera 750.

FIGS. 8C and 8D illustrate a 3D scene 850 including a 3D object 860 constructed for a 2D image 200 of the interior image type. The 3D object 860 may include a first plane 872 and a second plane 874, which may intersect at a line 880. The line 880 may be positioned at the location of the main feature 356, i.e., the concave interior corner, of the 2D image 200. The first plane 872 and the second plane 874 may be defined through the creation of an ellipse 890 in a manner similar to that set forth in the description of FIGS. 8A and 8B.

The ellipse 890 may have a major axis a and a minor axis b, and may pass through a first intersection $A_1$ and a second intersection $A_2$ with the image plane 740 and the vertical edges of the field of view 760. Only the side of the ellipse 890 that is concave relative to the virtual camera 750 is shown, as only that side is needed. This is due to the fact that the main feature 356 is a concave vertical corner.

As in FIGS. 8A and 8B, the line 880 may be located at a point $Q_2$ on the ellipse 890, which may be by drawing a ray 896 from the virtual camera 750 through the location P on the image plane 740 at which the vertical line defining the main feature 356 in the 2D image 200 has been placed. The ray 896 may intersect the ellipse 890 at the point $Q_2$. Thus, the position and orientation of each of the first plane 872 and the second plane 874 may be fully defined relative to the virtual camera position 366 of the virtual camera 750.

Figure 9A:
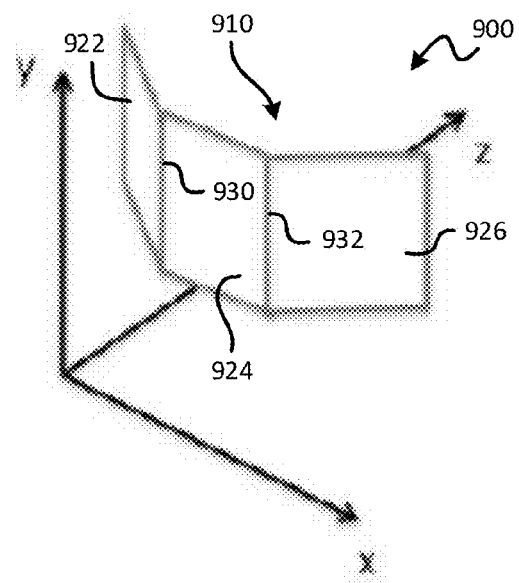
FIGS. 9A and 9B illustrate how the 3D scene for a people image type is constructed, according to one embodiment.
Figure 9B:
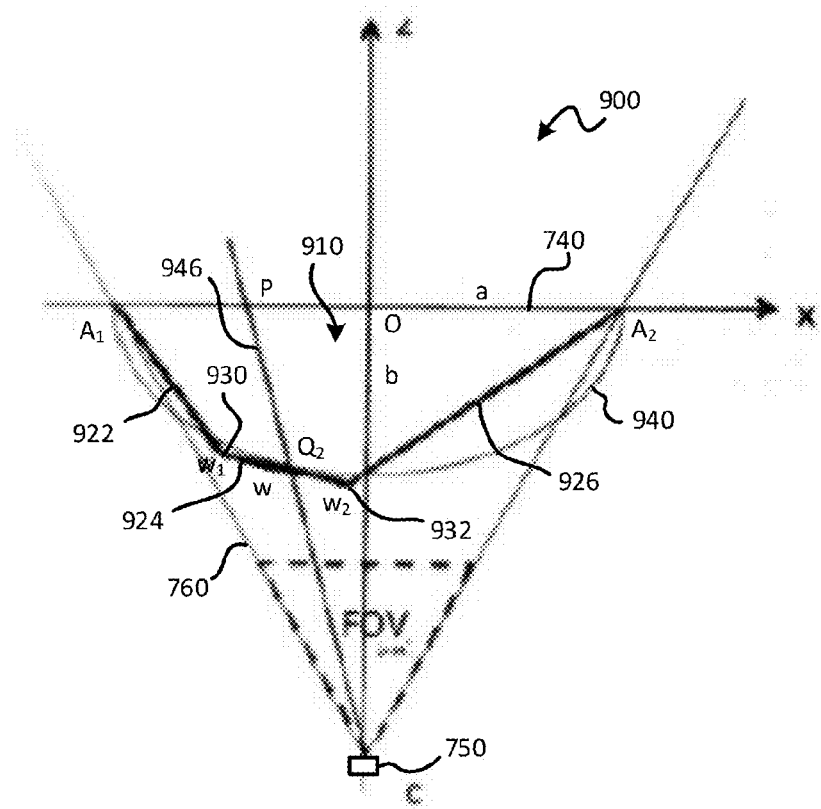

Referring to FIGS. 9A and 9B, perspective and plan views, respectively, illustrate the creation of a 3D scene 900 of the people image type. As shown in FIGS. 9A and 9B, the 3D scene 900 may include the virtual camera 750 and a 3D object 910, which may be an example of a 3D object 364 as discussed in the description of FIG. 3. The 3D object 910 may include a first plane 922 and a second plane 924, which may intersect the first plane 922 at a line 930. The 3D object 910 may further include a third plane 926, which may intersect the second plane 924 at a line 932. The first plane 922, the second plane 924, and the third plane 926 may all be perpendicular to the XZ plane. The line 930 and the line 932 may be aligned with the vertical edges of the rectangle that defines the face 530 that is the main feature 356 of the 2D image 200.

Thus, the resulting 3D view 370 may appear to bend around the edges of the face 530. The first plane 922, the second plane 924, and the third plane 926 may each be sized to occlude (i.e., cover) the entire vertical dimension 780 of the field of view 760 of the virtual camera 750. Additionally, the first plane 922, the second plane 924, and the third plane 926, combined, may be sized to occlude the entire horizontal dimension 770 of the field of view 760. Thus, the 3D object 910 may entirely occlude the field of view 760 so that, from the point of view of the virtual camera 750, only the 3D object 910 is visible. For the correct perspective correction, the horizon line may cross the orthocenter of the resulting 3D view 370, and the orthocenter may be in the center of the 3D view 370.

FIG. 9B illustrates how the 3D object 910 may be created. In one embodiment, an ellipse 940 may be formed. Only half of the ellipse 940 is shown in FIG. 9B for clarity; only the convex half of the ellipse 940 may be needed to define the positions and orientations of the first plane 922, the second plane 924, and the third plane 926 relative to each other. The size of the ellipse 940 may be determined by the parameters of the virtual camera 750 and/or the physical camera used to capture the 2D image 200. These parameters may include the field of view 760 (with reference to the virtual camera 750) and the focal distance.

More specifically, the ellipse 940 may have a major axis a positioned on the image plane 740, and a minor axis b perpendicular to the image plane 740. The major axis a may intersect the vertical edges of the image plane 740, thus intersecting the vertical edges of the field of view 760, to define a first intersection $A_1$ and a second intersection $A_2$, each of which may be a vertical line, which may appear as a point in FIG. 9B because $A_1$ and $A_2$ are perpendicular to the XZ plane. The ellipse 940 may pass through $A_1$ and $A_2$; thus, the focal distance and field of view of the virtual camera 750 may determine the length of the ellipse 940. The width of the ellipse 940, i.e., the length of the minor axis b, may be a fraction of that of the major axis a. In some embodiments, the length of the minor axis b may be within the range of ¼ of the length of the major axis a, to ½ of the length of the major axis a. More specifically, the length of the minor axis b may be about 5/16 of the length of the major axis a.

The first plane 922 may intersect the first intersection $A_1$ and the third plane 926 may intersect the second intersection $A_2$. In addition, the first plane 922 may intersect the second plane 924 at the line 930 and the second plane 924 may intersect the third plane 926 as indicated above. The second plane 924 may be tangent to the ellipse 940 and may thus contact the ellipse 940 at a point $Q_2$ (in the plan view of FIG. 9B). The point $Q_2$ may be located by drawing a ray 946 from the virtual camera 750 to the location P on the image plane 740 at which the center of the rectangle defining the main feature 356 in the 2D image 200 has been placed. The ray 946 may intersect the ellipse 940 at the point $Q_2$. The lines 930 and 932 may be positioned on the second plane 924 at a width w corresponding to the width of the rectangle defining the main feature 356 of the 2D image 200. Thus, the position and orientation of each of the first plane 922, the second plane 924, and the third plane 926 may be fully defined relative to the virtual camera position 366 of the virtual camera 750.

Figure 10A:
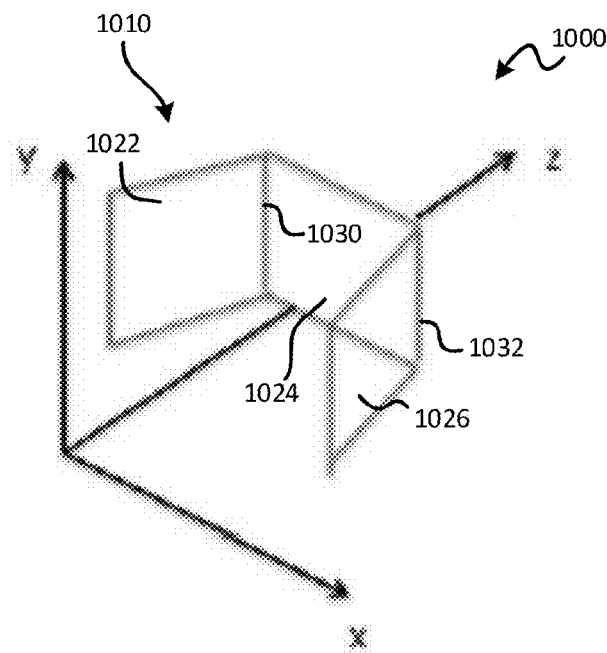
FIGS. 10A and 10B illustrate how the 3D scene for a corridor image type is constructed, according to one embodiment.
Figure 10B:
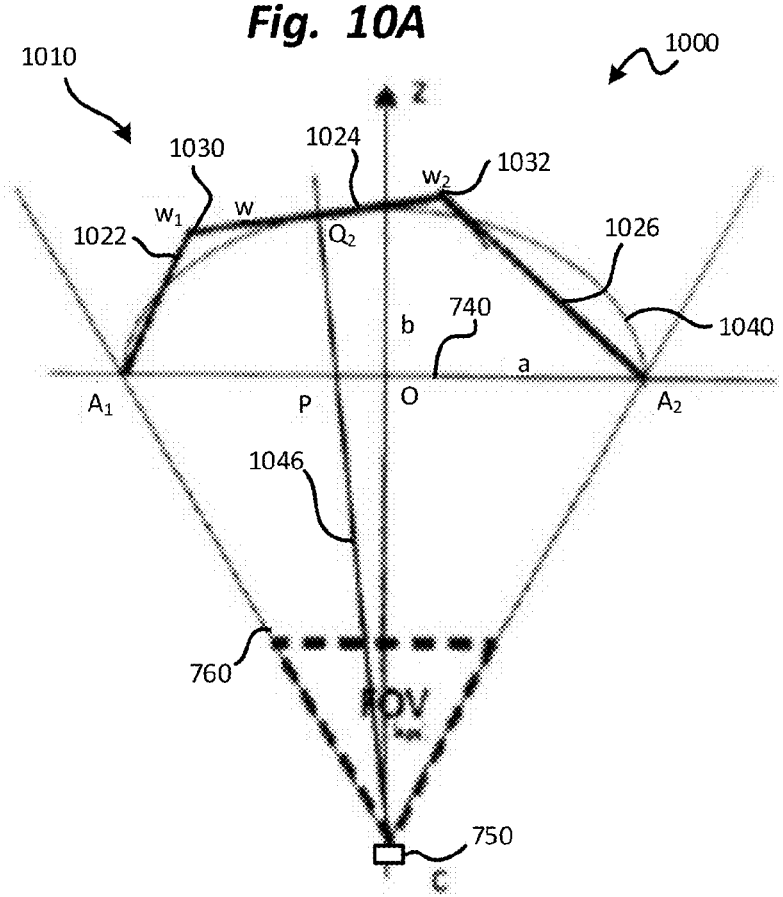

Referring to FIGS. 10A and 10B, perspective and plan views, respectively, illustrate the creation of a 3D scene 1000 for a 2D image 200 of the corridor image type. As shown in FIGS. 10A and 10B, the 3D scene 1000 may include the virtual camera 750 and a 3D object 1010, which may be an example of a 3D object 364 as discussed in the description of FIG. 3. The 3D object 1010 may include a first plane 1022 and a second plane 1024, which may intersect the first plane 1022 at a line 1030. The 3D object 1010 may further include a third plane 1026, which may intersect the second plane 1024 at a line 1032. The first plane 1022, the second plane 1024, and the third plane 1026 may all be perpendicular to the XZ plane. The line 1030 and the line 1032 may be aligned with the vertical edges of the rectangle that defines the boundary 540 of the corridor that is the main feature 356 of the 2D image 200.

Thus, the resulting 3D view 370 may appear to bend around the boundary 540. The first plane 1022, the second plane 1024, and the third plane 1026 may each be sized to occlude (i.e., cover) the entire vertical dimension 780 of the field of view 760 of the virtual camera 750. Additionally, the first plane 1022, the second plane 1024, and the third plane 1026, combined, may be sized to occlude the entire horizontal dimension 770 of the field of view 760. Thus, the 3D object 1010 may entirely occlude the field of view 760 so that, from the point of view of the virtual camera 750, only the 3D object 1010 is visible. For the correct perspective correction, the horizon line may cross the orthocenter of the resulting 3D view 370, and the orthocenter may be in the center of the 3D view 370.

FIG. 10B illustrates how the 3D object 1010 may be created. In one embodiment, an ellipse 1040 may be formed. Only half of the ellipse 1040 is shown in FIG. 10B for clarity; only the concave half of the ellipse 1040 may be needed to define the positions and orientations of the first plane 1022, the second plane 1024, and the third plane 1026 relative to each other. The size of the ellipse 1040 may be determined by the parameters of the virtual camera 750 and/or the physical camera used to capture the 2D image 200. These parameters may include the field of view 760 (with reference to the virtual camera 750) and the focal distance.

More specifically, the ellipse 1040 may have a major axis a positioned on the image plane 740, and a minor axis b perpendicular to the image plane 740. The major axis a may intersect the vertical edges of the image plane 740, thus intersecting the vertical edges of the field of view 760, to define a first intersection $A_1$ and a second intersection $A_2$, each of which may be a vertical line, which may appear as a point in FIG. 10B because $A_1$ and $A_2$ are perpendicular to the XZ plane. The ellipse 1040 may pass through $A_1$ and $A_2$; thus, the focal distance and field of view of the virtual camera 750 may determine the length of the ellipse 1040. The width of the ellipse 1040, i.e., the length of the minor axis b, may be a fraction of that of the major axis a. In some embodiments, the length of the minor axis b may be within the range of ¼ of the length of the major axis a, to ½ of the length of the major axis a. More specifically, the length of the minor axis b may be about 5/16 of the length of the major axis a.

The first plane 1022 may intersect the first intersection $A_1$ and the third plane 1026 may intersect the second intersection $A_2$. In addition, the first plane 1022 may intersect the second plane 1024 at the line 1030 and the second plane 1024 may intersect the third plane 1026 as indicated above. The second plane 1024 may be tangent to the ellipse 1040 and may thus contact the ellipse 1040 at a point $Q_2$ (in the plan view of FIG. 10B). The point $Q_2$ may be located by drawing a ray 1046 from the virtual camera 750 to the location P on the image plane 740 at which the center of the rectangle defining the main feature 356 in the 2D image 200 has been placed. The ray 1046 may intersect the ellipse 1040 at the point $Q_2$. The lines 1030 and 1032 may be positioned on the second plane 1024 at a width w corresponding to the width of the rectangle defining the main feature 356 of the 2D image 200. Thus, the position and orientation of each of the first plane 1022, the second plane 1024, and the third plane 1026 may be fully defined relative to the virtual camera position 366 of the virtual camera 750.

Figure 11A:
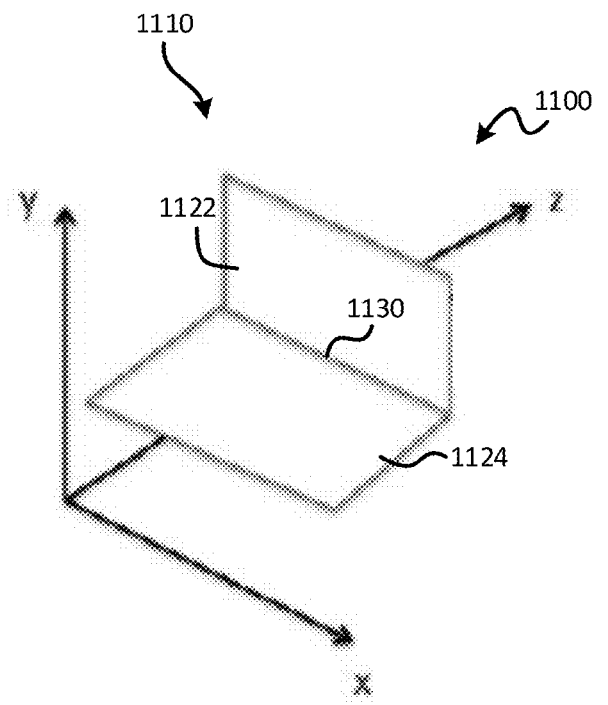
FIGS. 11A and 11B illustrate how the 3D scene for a landscape image type is constructed, according to one embodiment.
Figure 11B:
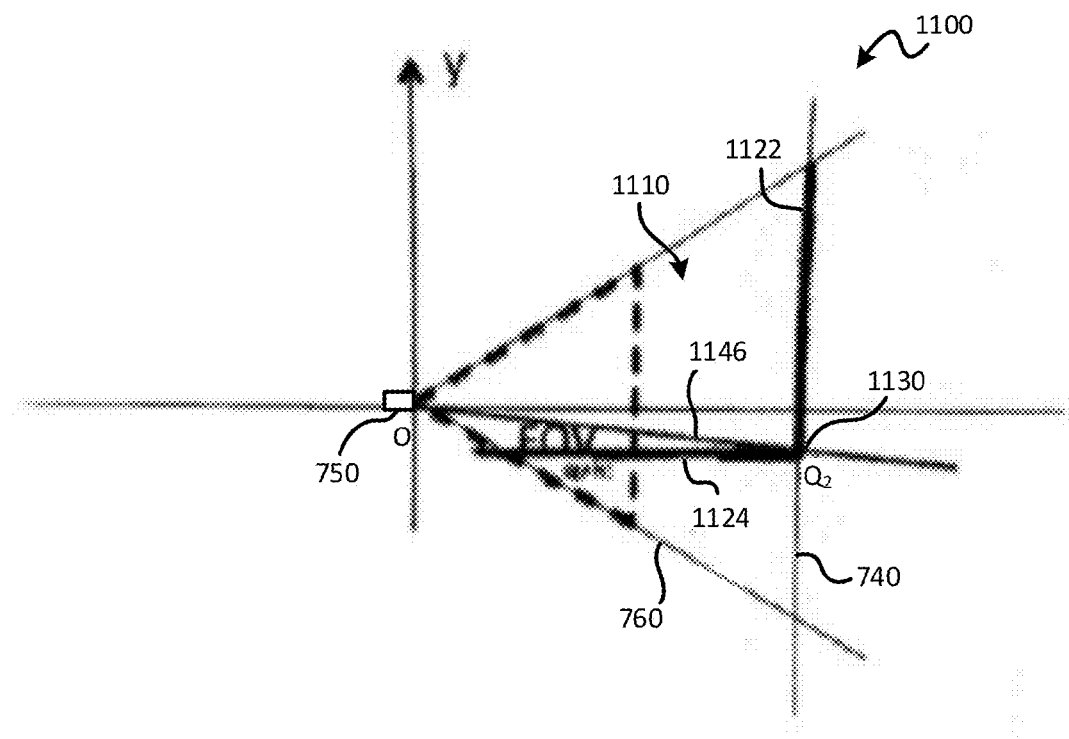

Referring to FIGS. 11A and 11B, perspective and side elevation views, respectively, illustrate the creation of a 3D scene 1100 for a 2D image 200 of the landscape image type. As shown in FIGS. 11A and 11B, the 3D scene 1100 may include the virtual camera 750 and a 3D object 1110, which may be an example of a 3D object 364 as discussed in the description of FIG. 3. The 3D object 1110 may include a first plane 1122 and a second plane 1124, which may intersect the first plane 1122 at a line 1130. The first plane 1122 and the second plane 1124 may both be perpendicular to the YZ plane. The line 1130 may be aligned with the horizontal line that defines the intersection 550 between background and floor portions that is the main feature 356 of the 2D image 200.

Thus, the resulting 3D view 370 may appear to bend around the intersection 550. The first plane 1122 and the second plane 1124 may each be sized to occlude (i.e., cover) the entire horizontal dimension 770 of the field of view 760 of the virtual camera 750. Additionally, the first plane 1122 and the second plane 1124, combined, may be sized to occlude the entire vertical dimension 780 of the field of view 760. Thus, the 3D object 1110 may entirely occlude the field of view 760 so that, from the point of view of the virtual camera 750, only the 3D object 1110 is visible. For the correct perspective correction, the horizon line may cross the orthocenter of the resulting 3D view 370, and the orthocenter may be in the center of the 3D view 370.

FIG. 11B illustrates how the 3D object 1110 may be created. In one embodiment, the first plane 1122 may be oriented vertically, coplanar with the image plane 740. The second plane 1124 may be oriented horizontally, as shown. The line 1130 may be positioned at a point $Q_2$ (in the side elevation view of FIG. 11B). The point $Q_2$ may be located by drawing a ray 1146 from the virtual camera 750 to the location on the image plane 740 at which the horizontal line defining the main feature 356 in the 2D image 200 has been placed. Thus, the position and orientation of each of the first plane 1122 and the second plane 1124 may be fully defined relative to the virtual camera position 366 of the virtual camera 750.

Figure 12A:
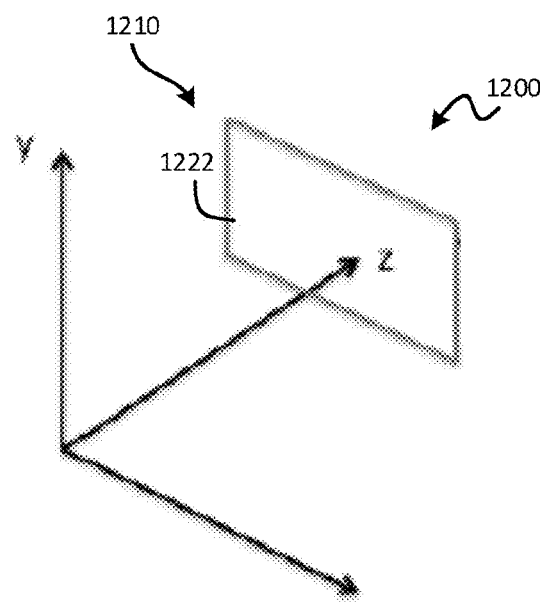
FIGS. 12A and 12B illustrate how the 3D scene for an image that does not fall into any of the other stated types is constructed, according to one embodiment.
Figure 12B:
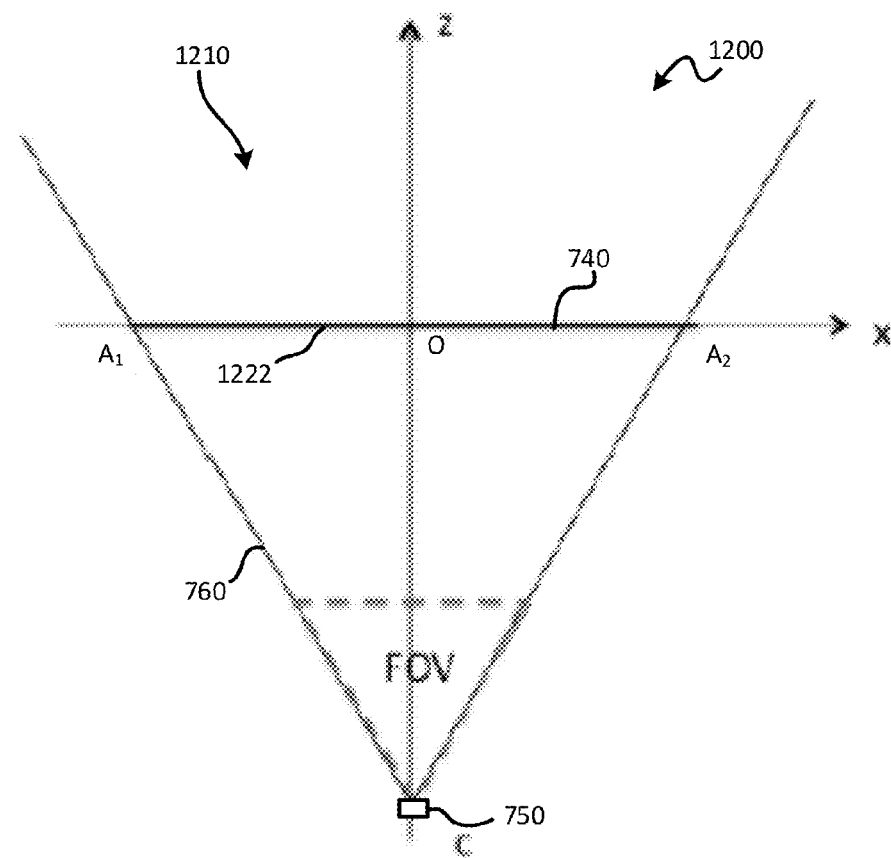

Referring to FIGS. 12A and 12B, perspective and plan views, respectively, illustrate the creation of a 3D scene 1200 for a 2D image 200 of the "other" image type. As shown in FIGS. 12A and 12B, the 3D scene 1200 may include the virtual camera 750 and a 3D object 1210, which may be an example of a 3D object 364 as discussed in the description of FIG. 3. The 3D object 1210 may include a first plane 1222, which may be coplanar with the image plane 740, and may thus be perpendicular to the Z axis. Since the "other" image type may have no main feature associated with it, the object 1210 may have only the first plane 1222. The object 1210 may thus not provide the illusion of motion around a corner or the like, but may, in any event, provide some degree of 3D immersion when the virtual camera 750 moves relative to it.

The first plane 1222 may be sized to occlude (i.e., cover) the entire horizontal dimension 770 and the vertical dimension 780 of the field of view 760 of the virtual camera 750. Thus, the 3D object 1210 may entirely occlude the field of view 760 so that, from the point of view of the virtual camera 750, only the 3D object 1210 is visible. For the correct perspective correction, the horizon line may cross the orthocenter of the resulting 3D view 370, and the orthocenter may be in the center of the 3D view 370.

FIG. 12B illustrates how the 3D object 1210 may be created. As mentioned previously, the first plane 1222 may be coplanar with the image plane 740. Thus, the position and orientation of the first plane 1222 may be fully defined relative to the virtual camera position 366 of the virtual camera 750.

As mentioned previously, it may be advantageous to enable motion of the virtual camera 750 relative to the 3D object 364. Such motion may be determined by the system 300 or controlled by the user 100. Further, if user-controlled, such motion may result in real-time generation and display of 3D views 370, or in generation and/or display of all such 3D views 370 after all user input has been received.

Figure 13:
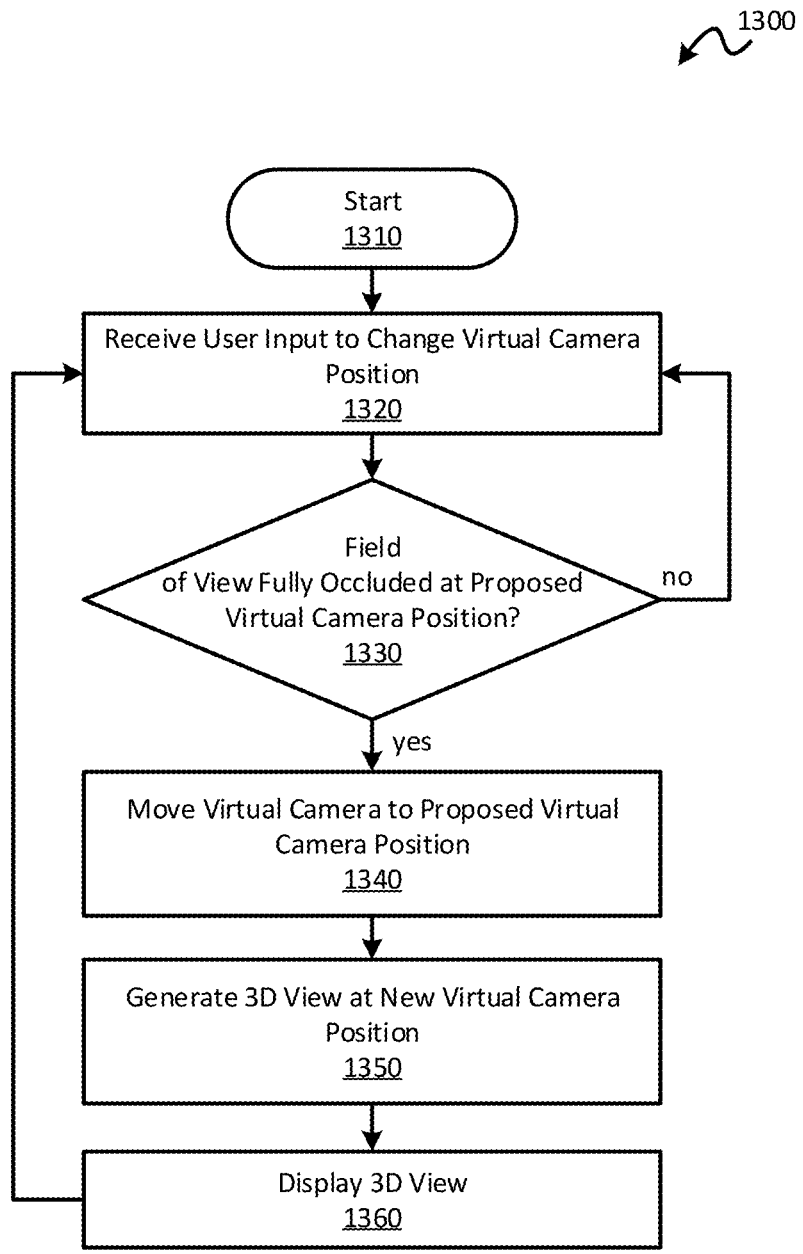
FIG. 13 is a flow diagram illustrating a method of generating one or more 3D views in response to user input, according to one embodiment.

Referring to FIG. 13, a flowchart diagram illustrates a method 1300 for providing real-time generation of new 3D views 370 in response to receipt of user input to move the virtual camera 750. The method 1300 of FIG. 13 may optionally be carried out after the completion of the method 400 of FIG. 4. The following description of the method 1300 will be provided with reference to the system 300 of FIG. 3. However, in alternative embodiments, the method 1300 may be performed with a variety of differently-configured systems. Further, in alternative embodiments, the system 300 may be used to carry out a variety of methods in addition to or in place of the method 1300 of FIG. 13.

As shown in FIG. 13, the method 1300 may start 1310 with a step 1320 in which user input is received, for example, in the input device 102, to reposition and/or reorient the virtual camera 750 to a new virtual camera position 366. This user input may be received in many forms, which may depend upon the type of input device 102 being used. For example, the user input may include moving a mouse, tapping a touch screen, pressing keys of a keyboard (such as arrow keys) to move the virtual camera 750 in the indicated direction or to the indicated position, or the like. In an alternative embodiment, repositioning or reorientation of the virtual camera 750 may be performed automatically, for example in accordance with a pre-programmed virtual camera move.

The method 1300 may then proceed to a query 1330 in which the system 300 determines whether the field of view 760 of the virtual camera 750 is fully occluded by the 3D object 364 at the indicated new virtual camera position 366. Full occlusion of the field of view 760 (i.e., occupation of the entire field of view 760) by the 3D object 364 may help to maintain the illusion of presence within the 3D environment; thus, it may be desirable for the system 300 not to permit motion of the virtual camera 750 to a location and/or orientation at which the 3D object 364 does not fully occlude the field of view 760.

Hence, if the 3D object 364 does not fully occlude the field of view 760, the method 1300 may return to the step 1320 to receive further input prior to moving forward with the generation of any additional 3D views 370. The user 100 may thus have the option to provide a different selection for the position and/or orientation of the virtual camera 750. After receipt of the new user input, the method 1300 may again carry out the query 1330.

If the 3D object 364 fully occludes the field of view 760, the method 1300 may proceed to a step 1340. In the step 1340, the virtual camera 750 may be moved, relative to the 3D object 364, to the position and/or orientation desired by the user 100.

Then, in a step 1350, a new 3D view 370 may be generated from the point of view of the new virtual camera position 366. This may be done through the use of the same methods used to obtain the initial virtual camera position 366, as described in connection with FIG. 3 and FIG. 4.

The method 1300 may then proceed to a step 1360 in which the new 3D view 370 is displayed for the user 100. This may also be done through the use of the same methods used to obtain the initial virtual camera position 366, as described on connection with FIG. 3 and FIG. 4.

The method 1300 may then return to the step 1320 so that the system 300 again receives user input to determine a new virtual camera position 366 for the virtual camera 750. The method 1300 may thus continuously receive user input, and generate and display corresponding 3D views 370, until the user 100 elects to terminate the method 1300.

Figure 14A:
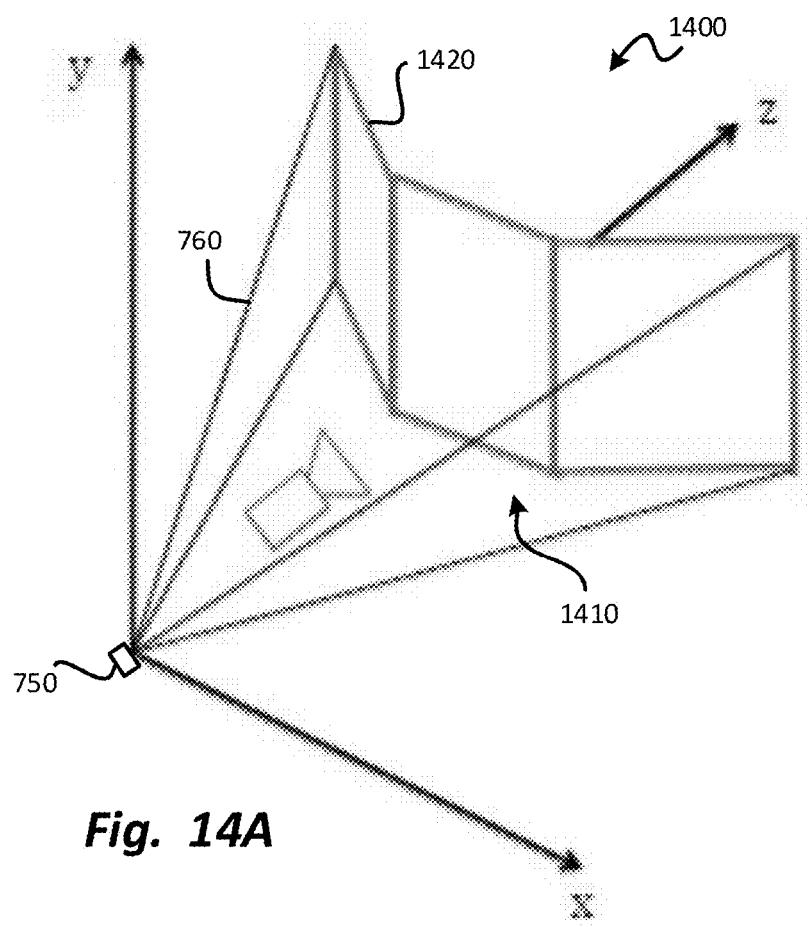
FIGS. 14A and 14B illustrate how a virtual camera can be positioned within 3D space to ensure an immersive experience, according to one embodiment.
Figure 14B:
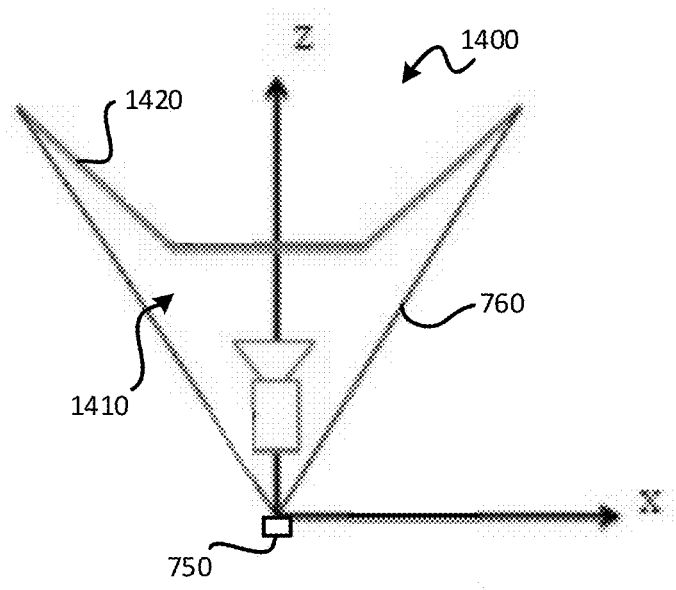

Referring to FIGS. 14A and 14B, perspective and plan views, respectively, illustrate a 3D scene 1400 with a 3D object 1410 in which the field of view 760 of the virtual camera 750 remains occluded by the 3D object 1410. As indicated in the description of the query 1330, to ensure an immersive experience when moving the virtual camera 750 inside the 3D scene, the system 300 may ensure that the field of view 760 of the virtual camera 750 remains fully occluded by the 3D object 1410. This may entail ensuring that the field of view 760 never crosses the 3D border, along the X or the Y axis, as depicted in FIGS. 14A and 4B.

To achieve this, a polyline 1420 may be defined along the contour of the 3D object 1410. The polyline 1420 may be used to facilitate performance of the query 1330 of the method 1300 of FIG. 13. For example, the system 300 may calculate, for an intended position and/or orientation of the virtual camera 750, whether the field of view 760 intersects with the polyline 1420. Whenever such intersection occurs, the query 1330 may be answered in the negative, resulting in blockage of motion of the virtual camera 750 to that position and/or orientation. An example of this will be shown and described in connection with in FIGS. 15A and 15B.

Figure 15A:
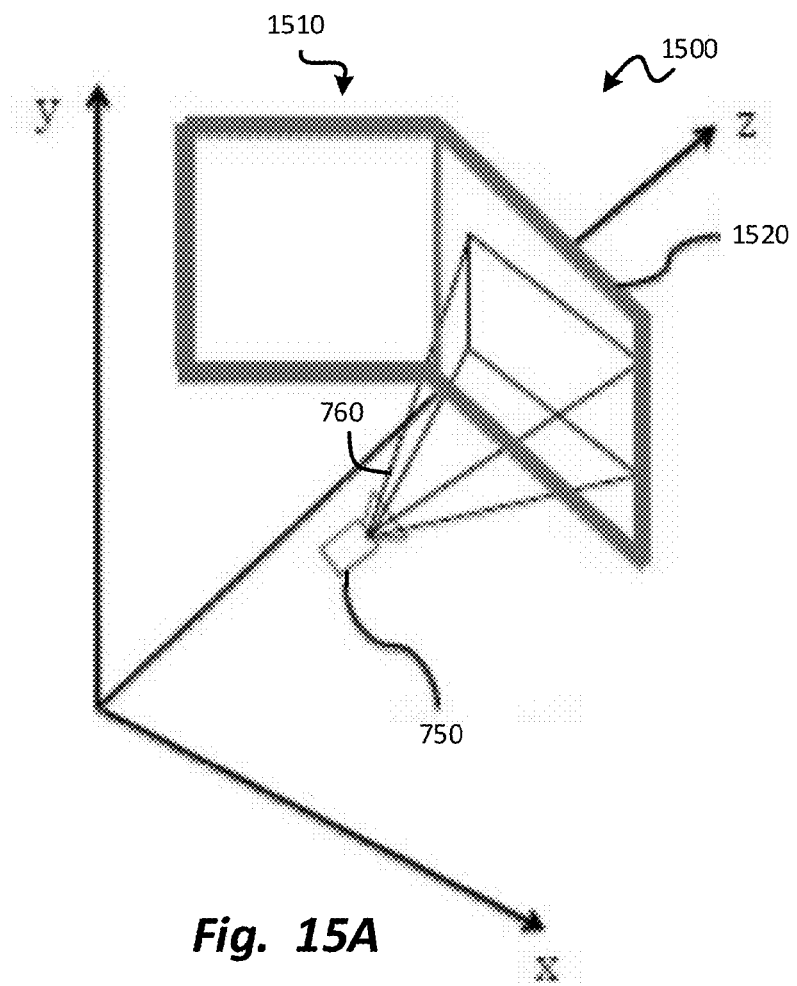
FIGS. 15A and 15B illustrate how a virtual camera is constrained inside the contours of the 3D scene, according to one embodiment.
Figure 15B:
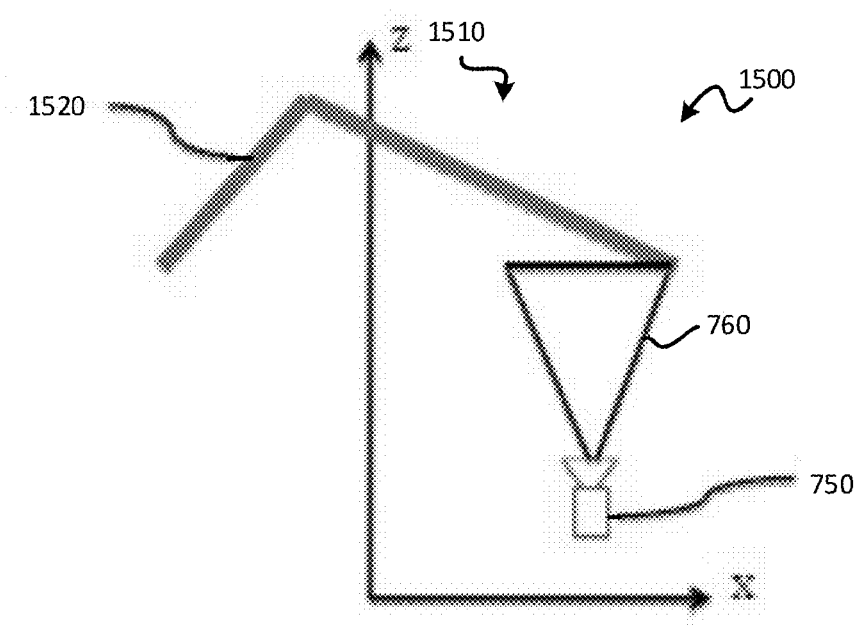

Referring to FIGS. 15A and 15B, perspective and plan views, respectively, illustrate a 3D scene 1500 with a 3D object 1510 in which the field of view 760 of the virtual camera 750 remains occluded by the 3D object 1510. The 3D object 1510 may have a polyline 1520 at its perimeter as set forth in the description of FIGS. 14A and 14B. As illustrated, the virtual camera 750 has been moved to a position and orientation in which the field of view 760 intersects the polyline 1520. Thus, the resulting 3D view 370 may not be generated and/or displayed for the user 100. Rather, the system 300 may wait for further user input to move the virtual camera 750 to a position and orientation in which the field of view 760 of the virtual camera 750 does not intersect the polyline 1520, prior to generating or displaying such additional 3D views 370.

The polyline 1520 may thus function as a "transparent" cage in the 3D scene 1500. Such a cage may act to constrain the area in which the virtual camera 750 can move. In FIGS. 15A and 15B, the cage may be built based on the field of view 760 of the virtual camera 750 within the 3D scene 1500, at an empirical distance from the remainder of the 3D scene 1500. Further details of such a cage are provided in related U.S. patent application Ser. No. 13/226,695, titled "Generating Three-Dimensional Virtual Tours from Two-Dimensional Images", filed Sep. 7, 2011, which is incorporated herein by reference.

For illustrative purposes, FIGS. 16A, 16B, 17A, 17B, 18A, and 18B illustrate examples of the immersive experience generated from 2D images following the procedures set forth herein. For illustrative purposes, each pair of Figures presents four 3D views 370: one at the initial position of the virtual camera 750 ("Camera position 0"), one in which the virtual camera 750 has been "dollied" closer to the 3D object 364 ("Camera position 1"), one in which the virtual camera 750 has been moved leftward relative to Camera position 1 ("Camera position 2"), and one in which the virtual camera 750 has been moved rightward relative to Camera position 1 ("Camera position 3").

Figure 16A:
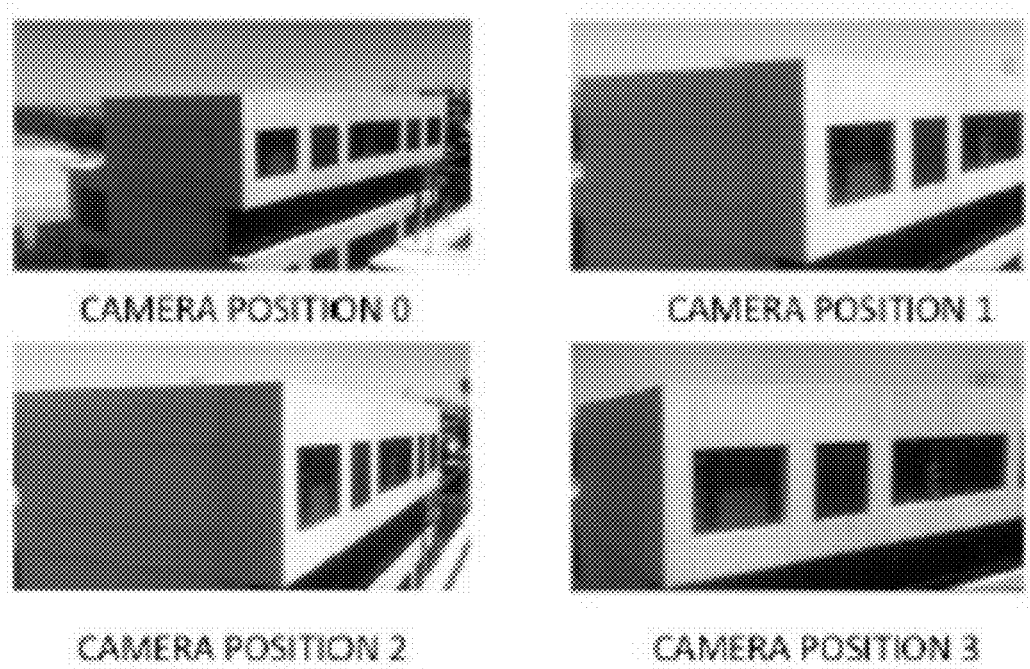
FIGS. 16A and 16B illustrate an example of the immersive experience generated from a 2D image of the exterior image type, following the procedures depicted in FIGS. 4 and 13, according to one embodiment.
Figure 16B:
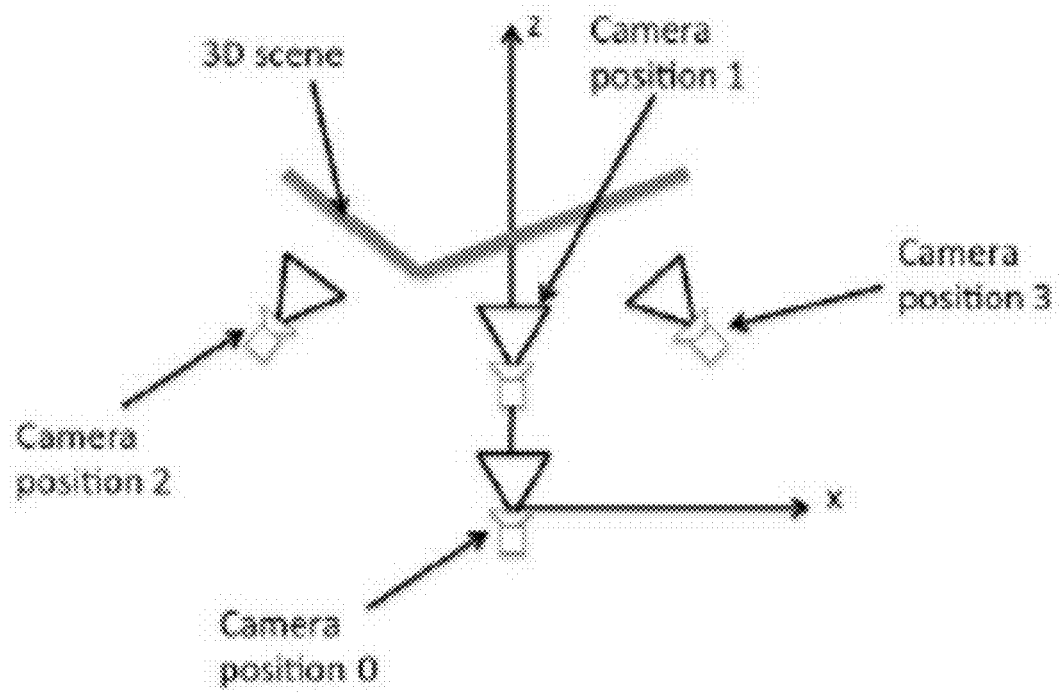

Referring to FIGS. 16A and 16B, 3D views and a plan view, respectively, illustrate the output provided according to one embodiment. The 3D views 370 of FIG. 16A may be obtained from a 2D image 200 of the exterior image type.

Figure 17A:
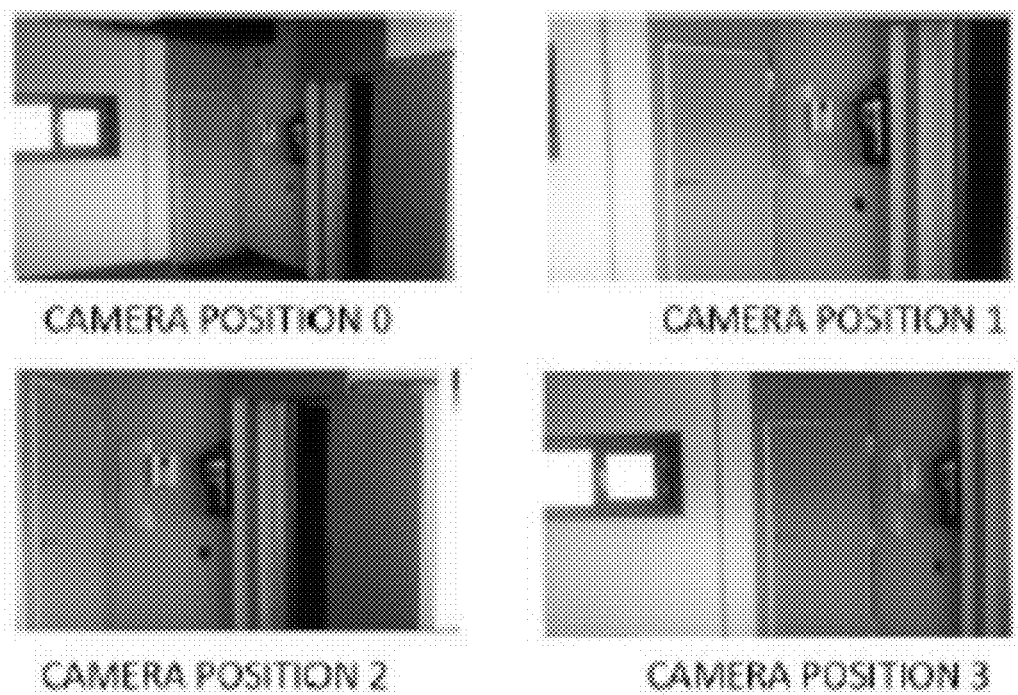
FIGS. 17A and 17B illustrate an example of the immersive experience generated from a 2D image of the interior image type, following the procedures depicted in FIGS. 4 and 13, according to one embodiment.
Figure 17B:
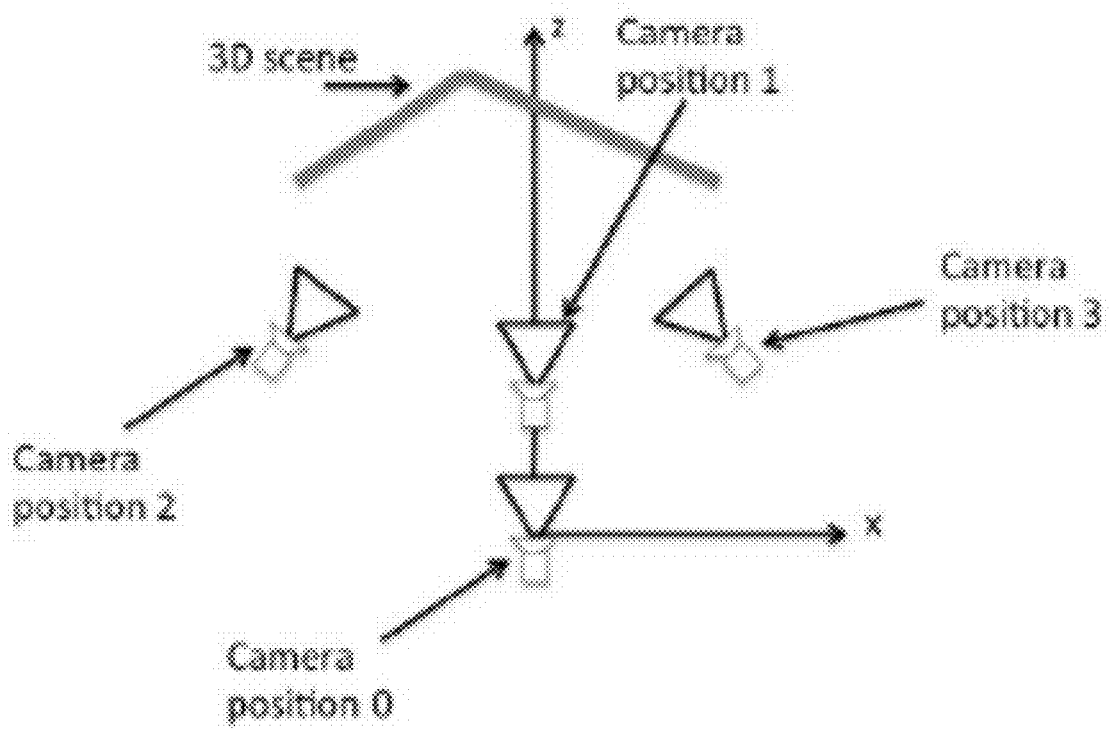

Referring to FIGS. 17A and 17B, 3D views and a plan view, respectively, illustrate the output provided according to one embodiment. The 3D views 370 of FIG. 17A may be obtained from a 2D image 200 of the interior image type.

Figure 18A:
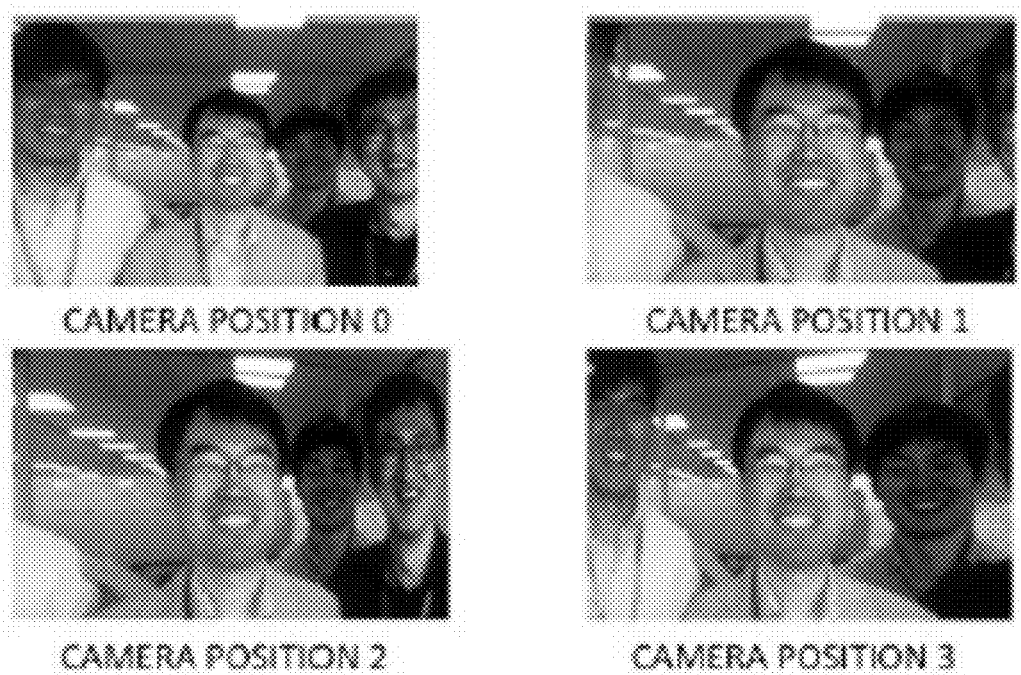
FIGS. 18A and 18B illustrate an example of the immersive experience generated from a 2D image of the people image type, following the procedures depicted in FIGS. 4 and 13, according to one embodiment.
Figure 18B:
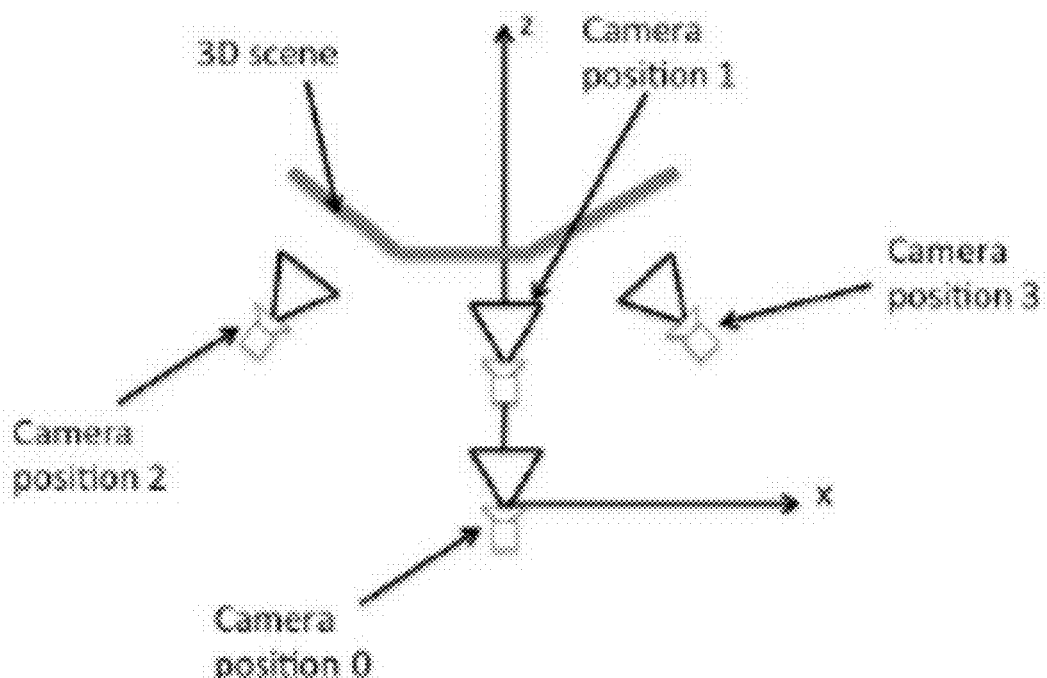

Referring to FIGS. 18A and 18B, 3D views and a plan view, respectively, illustrate the output provided according to one embodiment. The 3D views 370 of FIG. 17A may be obtained from a 2D image 200 of the people image type.

FIGS. 19, 20, and 21 show an implementation of this embodiment on a smartphone. Each of these illustrations illustrates an embodiment in which the 2D image 200 to be processed is captured with the device 101 (i.e., the smartphone) with a built-in image capture apparatus 107, which may take the form of a digital camera as described above. The main feature 356 is then selected by the user 100. Then after the method 400 of FIG. 4 is complete, the user 100 is able to enjoy a 3D interactive immersive experience on the smartphone through the use of the method 1300 of FIG. 13.

Referring to FIG. 19, a series of images illustrate application of the methods described above to generate 3D views 370 from a 2D image 200. The 3D views 370 of FIG. 19 may be obtained from a 2D image 200 of the exterior image type.

Referring to FIG. 20, a series of images illustrate application of the methods described above to generate 3D views 370 from a 2D image 200. The 3D views 370 of FIG. 20 may be obtained from a 2D image 200 of the interior image type.

Referring to FIG. 21, a series of images illustrate application of the methods described above to generate 3D views 370 from a 2D image 200. The 3D views 370 of FIG. 21 may be obtained from a 2D image 200 of the people image type.

The above description and referenced drawings set forth particular details with respect to possible embodiments. Those of skill in the art will appreciate that the techniques described herein may be practiced in other embodiments. First, the particular naming of the components, capitalization of terms, the attributes, data structures, or any other programming or structural aspect is not mandatory or significant, and the mechanisms that implement the techniques described herein may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

Some embodiments may include a system or a method for performing the above-described techniques, either singly or in any combination. Other embodiments may include a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions of described herein can be embodied in software, firmware and/or hardware, and when embodied in software, can be downloaded to reside on and be operated from different platforms used by a variety of operating systems.

Some embodiments relate to an apparatus for performing the operations described herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, flash memory, solid state drives, magnetic or optical cards, application specific integrated circuits (ASICs), and/or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the techniques set forth herein are not described with reference to any particular programming language. It will be appreciated that a variety of programming languages may be used to implement the techniques described herein, and any references above to specific languages are provided for illustrative purposes only.

Accordingly, in various embodiments, the techniques described herein can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the techniques described herein include: a mobile phone, personal digital assistant, smartphone, kiosk, server computer, enterprise computing device, desktop computer, laptop computer, tablet computer, consumer electronic device, television, set-top box, or the like. An electronic device for implementing the techniques described herein may use any operating system such as, for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

In various embodiments, the techniques described herein can be implemented in a distributed processing environment, networked computing environment, or web-based computing environment. Elements can be implemented on client computing devices, servers, routers, and/or other network or non-network components. In some embodiments, the techniques described herein are implemented using a client/server architecture, wherein some components are implemented on one or more client computing devices and other components are implemented on one or more servers. In one embodiment, in the course of implementing the techniques of the present disclosure, client(s) request content from server(s), and server(s) return content in response to the requests. A browser may be installed at the client computing device for enabling such requests and responses, and for providing a user interface by which the user can initiate and control such interactions and view the presented content.

Any or all of the network components for implementing the described technology may, in some embodiments, be communicatively coupled with one another using any suitable electronic network, whether wired or wireless or any combination thereof, and using any suitable protocols for enabling such communication. One example of such a network is the Internet, although the techniques described herein can be implemented using other networks as well.

While a limited number of embodiments has been described herein, those skilled in the art, having benefit of the above description, will appreciate that other embodiments may be devised which do not depart from the scope of the claims. In addition, it should be noted that the language used in the specification has been principally selected for readability and instructional purposes, and may not have been selected to delineate or circumscribe the inventive subject matter. Accordingly, the disclosure is intended to be illustrative, but not limiting.

What is claimed is:

1. A computer-implemented method for generating a three-dimensional view from a first two-dimensional image, the method comprising:
    receiving a first two-dimensional image;
    identifying, from a plurality of image types, a first image type for the entirety of the two-dimensional image, wherein the image type indicates a classification of the nature of a scene represented by the two-dimensional image;
    identifying, within the first two-dimensional image, a first main feature having a first main feature type associated with the first image type, wherein the first main feature comprises an element of the scene represented by the two-dimensional image;
    at a processor, generating a first plane within a virtual three-dimensional image space;
    at the processor, generating a second plane within the virtual three-dimensional image space, wherein the second plane intersects the first plane at a line on the first main feature;
    using the processor to automatically project the first two-dimensional image onto the first plane and the second plane to define a first three-dimensional object within the virtual three-dimensional image space;
    using the processor to automatically position a virtual camera at a first camera position within the virtual three-dimensional image space proximate the first three-dimensional object;
    using three-dimensional rendering capability of the processor to automatically generate a first three-dimensional view of at least a portion of the first three-dimensional object from the virtual camera; and
    at a display screen, displaying the first three-dimensional view.

2. The computer-implemented method of claim 1, wherein identifying the first image type comprises, at an input device, receiving first user input indicating the first image type.

3. The computer-implemented method of claim 2, further comprising, prior to identifying the first main feature, selecting the first main feature type from a plurality of main feature types based on the first image type.

4. The computer-implemented method of claim 3, wherein identifying the first main feature comprises, at the input device, receiving second user input identifying the first main feature.

5. The computer-implemented method of claim 1, wherein the plurality of image types comprises an interior image type, an exterior image type, a people image type, a corridor image type, and a landscape image type.

6. The computer-implemented method of claim 1, wherein the first image type comprises an interior image type indicative of representation by the first two-dimensional image of an interior of a structure;
    wherein the first main feature comprises a concave vertical corner of the structure;
    and wherein identifying the first main feature comprises positioning a vertical line proximate the concave vertical corner.

7. The computer-implemented method of claim 1, wherein the first image type comprises an exterior image type indicative of representation by the first two-dimensional image of an exterior of a structure;
    wherein the first main feature comprises a convex vertical corner of the structure;
    and wherein identifying the first main feature comprises positioning a vertical line proximate the convex vertical corner.

8. The computer-implemented method of claim 1, wherein the first image type comprises a people image type indicative of representation by the first two-dimensional image of a person;
    wherein the first main feature comprises a face of the person;
    and wherein identifying the first main feature comprises positioning a rectangle to frame the face.

9. The computer-implemented method of claim 1, wherein the first image type comprises a corridor image type indicative of representation by the first two-dimensional image of a corridor within a structure;
    wherein the first main feature comprises the corridor;
    and wherein identifying the first main feature comprises positioning a rectangle to define boundaries of the corridor.

10. The computer-implemented method of claim 1, wherein the first image type comprises a landscape image type indicative of representation by the first two-dimensional image of a landscape comprising a background and a floor;
    wherein the first main feature comprises a concave horizontal corner defining an intersection between the background and the floor;
    and wherein identifying the first main feature comprises positioning a horizontal line proximate the concave horizontal corner.

11. The computer-implemented method of claim 1, wherein the first two-dimensional image comprises an image plane that bounds a field of view;
    wherein the first image type comprises a selection from the group consisting of an interior image type and an exterior image type;
    wherein the first main feature comprises a vertical corner of a structure;
    wherein identifying the first main feature comprises positioning a vertical line proximate the vertical corner;
    wherein generating the first plane comprises:
    defining an ellipse comprising a major axis within the image plane, wherein, at a first major end of the ellipse, the major axis intersects a first edge of the field of view to define a first intersection and, at a second major end of the ellipse, the major axis intersects a second edge of the field of view to define a second intersection; and
    defining the first plane such that the first plane passes through the first intersection and the vertical line;
    and wherein generating the second plane comprises generating the second plane such that the second plane passes through the second intersection and the vertical line.

12. The computer-implemented method of claim 11, wherein defining the ellipse further comprises setting a length of a minor axis of the ellipse such that the minor axis has a minor length ranging from one quarter to one half of a major length of the major axis.

13. The computer-implemented method of claim 1, wherein the first two-dimensional image comprises an image plane that bounds a field of view;
   wherein the first image type comprises a selection from the group consisting of a people image type and a corridor image type;
   wherein the first main feature is selected from the group consisting of a face of a person and a corridor;
   wherein identifying the first main feature comprises positioning a rectangle proximate the first main feature, the rectangle comprising a first vertical edge and a second vertical edge;
   wherein generating the first plane comprises:
   defining an ellipse comprising a major axis within the image plane, wherein, at a first major end of the ellipse, the major axis intersects a first edge of the field of view to define a first intersection and, at a second major end of the ellipse, the major axis intersects a second edge of the field of view to define a second intersection; and
   defining the first plane such that the first plane passes through the first intersection and the first vertical edge;
   wherein generating the second plane comprises generating the second plane such that the second plane is tangent to the ellipse and passes through the first intersection and the second intersection;
   wherein the method further comprises generating a third plane such that the third plane passes through the second vertical edge and the second intersection;
   and wherein applying the two-dimensional image to the first plane and the second plane further comprises applying the first two-dimensional image to the third plane to define the first three-dimensional object.

14. The computer-implemented method of claim 13, wherein defining the ellipse further comprises setting a length of a minor axis of the ellipse such that the minor axis has a minor length of about five sixteenths of a major length of the major axis.

15. The computer-implemented method of claim 1, wherein the first two-dimensional image comprises an image plane that bounds a field of view;
   wherein the first image type is a landscape image type;
   wherein the first main feature comprises a concave horizontal corner defining an intersection between a background and a floor;
   wherein identifying the first main feature comprises positioning a horizontal line proximate the concave horizontal corner;
   wherein generating the first plane comprises defining the first plane such that the first plane extends horizontally and passes through the horizontal line;
   and wherein generating the second plane comprises generating the second plane such that the second plane extends vertically and passes through the horizontal line.

16. The computer-implemented method of claim 1, further comprising:
   receiving a second two-dimensional image;
   identifying, from the plurality of image types, a second image type for the entirety of the second two-dimensional image, wherein the second image type indicates a classification of the nature of a scene represented by the second two-dimensional image, wherein the second image type is an "other" image type;
   at a processor, generating a third plane within the virtual three-dimensional image space;
   using the processor to automatically project the second two-dimensional image onto the third plane to define a second three-dimensional object within the virtual three-dimensional image space;
   using the processor to automatically position the virtual camera at a second camera position within the virtual three-dimensional image space proximate the second three-dimensional object;
   using three-dimensional rendering capability of the processor to automatically generate a second three-dimensional view of at least a portion of the second three-dimensional object; and
   at the display screen, displaying the second three-dimensional view.

17. The computer-implemented method of claim 1, further comprising:
   at an input device, receiving a first user input;
   in response to receipt of the first user input, using the processor to automatically position the virtual camera at a second camera position offset from the first camera position within the virtual three-dimensional image space;
   using three-dimensional rendering capability of the processor to automatically generate a second three-dimensional view of at least a portion of the first three-dimensional object from the virtual camera; and
   at the display screen, displaying the second three-dimensional view.

18. The computer-implemented method of claim 17, further comprising:
   at the input device, receiving a second user input indicating a desire to move the virtual camera to a third virtual camera position;
   in response to receipt of the second user input, determining that, at the third virtual camera position, a field of view of the virtual camera would not be entirely occluded by the first three-dimensional object; and
   in response to determining that, at the third virtual camera position, the field of view would not be entirely occluded by the first three-dimensional object, determining that the virtual camera will not be moved to the third virtual camera position.

19. The computer-implemented method of claim 1, wherein identifying the first image type comprises, at the processor, automatically determining the first image type based on identification of an image feature of the first two-dimensional image.

20. A computer program product for generating a three-dimensional view from a first two-dimensional image, the computer program product comprising:
   a non-transitory storage medium; and
   computer program code, encoded on the medium, configured to cause at least one processor to perform the steps of:
   receiving a first two-dimensional image;
   identifying, from a plurality of image types, a first image type for the entirety of the two-dimensional image, wherein the image type indicates a classification of the nature of a scene represented by the two-dimensional image;
   identifying, within the first two-dimensional image, a first main feature having a first main feature type associated with the first image type, wherein the first main feature comprises an element of the scene represented by the two-dimensional image;
   generating a first plane within a virtual three-dimensional image space;

generating a second plane within the virtual three-dimensional image space, wherein the second plane intersects the first plane at a line on the first main feature;

automatically projecting the first two-dimensional image onto the first plane and the second plane to define a first three-dimensional object within the virtual three-dimensional image space;

automatically positioning a virtual camera at a first camera position within the virtual three-dimensional image space proximate the first three-dimensional object;

using three-dimensional rendering capability of the processor to automatically generate a first three-dimensional view of at least a portion of the first three-dimensional object from the virtual camera; and causing a display screen to display the first three-dimensional view.

21. The computer program product of claim 20, wherein the computer program code is further configured to cause the at least one processor to identify the first image type by causing an input device to receive first user input indicating the first image type.

22. The computer program product of claim 21, wherein the computer program code is further configured to cause the at least one processor, prior to identifying the first main feature, to select the first main feature type from a plurality of main feature types based on the first image type;

and wherein the computer program code is further configured to cause the at least one processor to identify the first main feature by causing the input device to receive second user input identifying the first main feature.

23. The computer program product of claim 20, wherein the first image type comprises an interior image type indicative of representation by the first two-dimensional image of an interior of a structure;

wherein the first main feature comprises a concave vertical corner of the structure;

and wherein the computer program code is further configured to cause the at least one processor to identify the first main feature by positioning a vertical line proximate the concave vertical corner.

24. The computer program product of claim 20, wherein the first image type comprises an exterior image type indicative of representation by the first two-dimensional image of an exterior of a structure;

wherein the first main feature comprises a convex vertical corner of the structure;

and wherein the computer program code is further configured to cause the at least one processor to identify the first main feature by positioning a vertical line proximate the convex vertical corner.

25. The computer program product of claim 20, wherein the first image type comprises a people image type indicative of representation by the first two-dimensional image of a person;

wherein the first main feature comprises a face of the person;

and wherein the computer program code is further configured to cause the at least one processor to identify the first main feature by positioning a rectangle to frame the face.

26. The computer program product of claim 20, wherein the first image type comprises a corridor image type indicative of representation by the first two-dimensional image of a corridor within a structure;

wherein the first main feature comprises the corridor;

and wherein the computer program code is further configured to cause the at least one processor to identify the first main feature by positioning a rectangle to define boundaries of the corridor.

27. The computer program product of claim 20, wherein the first image type comprises a landscape image type indicative of representation by the first two-dimensional image of a landscape comprising a background and a floor;

wherein the first main feature comprises a concave horizontal corner defining an intersection between the background and the floor;

and wherein the computer program code is further configured to cause the at least one processor to identify the first main feature by positioning a horizontal line proximate the concave horizontal corner.

28. The computer program product of claim 20, wherein the first two-dimensional image comprises an image plane that bounds a field of view;

wherein the first image type comprises a selection from the group consisting of an interior image type and an exterior image type;

wherein the first main feature comprises a vertical corner of a structure;

wherein the computer program code is further configured to cause the at least one processor to identify the first main feature by positioning a vertical line proximate the vertical corner;

wherein the computer program code is further configured to cause the at least one processor to generate the first plane by:

defining an ellipse comprising a major axis within the image plane, wherein, at a first major end of the ellipse, the major axis intersects a first edge of the field of view to define a first intersection and, at a second major end of the ellipse, the major axis intersects a second edge of the field of view to define a second intersection; and defining the first plane such that the first plane passes through the first intersection and the vertical line;

and wherein the computer program code is further configured to cause the at least one processor to generate the second plane by generating the second plane such that the second plane passes through the second intersection and the vertical line.

29. The computer program product of claim 20, wherein the first two-dimensional image comprises an image plane that bounds a field of view;

wherein the first image type comprises a selection from the group consisting of a people image type and a corridor image type;

wherein the first main feature is selected from the group consisting of a face of a person and a corridor;

wherein the computer program code is further configured to cause the at least one processor to identify the first main feature by positioning a rectangle proximate the first main feature, the rectangle comprising a first vertical edge and a second vertical edge;

wherein the computer program code is further configured to cause the at least one processor to generate the first plane by:

defining an ellipse comprising a major axis within the image plane, wherein, at a first major end of the ellipse, the major axis intersects a first edge of the field of view to define a first intersection and, at a second major end of the ellipse, the major axis intersects a second edge of the field of view to define a second intersection; and defining the first plane such that the first plane passes through the first intersection and the first vertical edge;

wherein the computer program code is further configured to cause the at least one processor to generate the second plane by generating the second plane such that the second plane is tangent to the ellipse and passes through the first intersection and the second intersection;

wherein the computer program code is further configured to cause the at least one processor to generate a third plane such that the third plane passes through the second vertical edge and the second intersection;

and wherein the computer program code is further configured to cause the at least one processor to apply the two-dimensional image to the first plane and the second plane by applying the first two-dimensional image to the third plane to define the first three-dimensional object.

30. The computer program product of claim 20, wherein the first two-dimensional image comprises an image plane that bounds a field of view;

wherein the first image type is a landscape image type;

wherein the first main feature comprises a concave horizontal corner defining an intersection between a background and a floor;

wherein the computer program code is further configured to cause the at least one processor to identify the first main feature by positioning a horizontal line proximate the concave horizontal corner;

wherein the computer program code is further configured to cause the at least one processor to generate the first plane by defining the first plane such that the first plane extends horizontally and passes through the horizontal line;

and wherein the computer program code is further configured to cause the at least one processor to generate the second plane by generating the second plane such that the second plane extends vertically and passes through the horizontal line.

31. The computer program product of claim 20, wherein the computer program code is further configured to cause the at least one processor to perform the steps of:

causing an input device to receive a first user input;

in response to receipt of the first user input, automatically positioning the virtual camera at a second camera position offset from the first camera position within the virtual three-dimensional image space;

using three-dimensional rendering capability of the processor to automatically generate a second three-dimensional view of at least a portion of the first three-dimensional object from the virtual camera; and causing the display screen to display the second three-dimensional view.

32. The computer program product of claim 31, wherein the computer program code is further configured to cause the at least one processor to perform the steps of:

causing the input device to receive a second user input indicating a desire to move the virtual camera to a third virtual camera position;

in response to receipt of the second user input, determining that, at the third virtual camera position, a field of view of the virtual camera would not be entirely occluded by the first three-dimensional object; and in response to determining that, at the third virtual camera position, the field of view would not be entirely occluded by the first three-dimensional object, determining that the virtual camera will not be moved to the third virtual camera position.

33. A system for generating a three-dimensional view from a first two-dimensional image, the system comprising:

a processor, configured to:
receive a first two-dimensional image;
identify, from a plurality of image types, a first image type for the entirety of the two-dimensional image, wherein the image type indicates a classification of the nature of a scene represented by the two-dimensional image;
identify, within the first two-dimensional image, a first main feature having a first main feature type associated with the first image type, wherein the first main feature comprises an element of the scene represented by the two-dimensional image;
generate a first plane within a virtual three-dimensional image space;
generate a second plane within the virtual three-dimensional image space, wherein the second plane intersects the first plane at a line on the first main feature;
automatically project the first two-dimensional image onto the first plane and the second plane to define a first three-dimensional object within the virtual three-dimensional image space;
automatically position a virtual camera at a first camera position within the virtual three-dimensional image space proximate the first three-dimensional object; and
using three-dimensional rendering capability of the processor to automatically generate a first three-dimensional view of at least a portion of the first three-dimensional object from the virtual camera; and a display screen, communicatively coupled to the processor, configured to display the first three-dimensional view.

34. The system of claim 33, further comprising, an input device, communicatively coupled to the processor, configured to receive first user input indicating the first image type;

wherein the processor is further configured to identify the first image type based on the first user input.

35. The system of claim 34, wherein the processor is further configured, prior to identification of the first main feature, to select the first main feature type from a plurality of main feature types based on the first image type;

wherein the input device is further configured to receive second user input identifying the first main feature;

and wherein the processor is further configured to identify the first main feature based on the second user input.

36. The system of claim 33, wherein the first image type comprises an interior image type indicative of representation by the first two-dimensional image of an interior of a structure;

wherein the first main feature comprises a concave vertical corner of the structure;

and wherein the processor is further configured to identify the first main feature by positioning a vertical line proximate the concave vertical corner.

37. The system of claim 33, wherein the first image type comprises an exterior image type indicative of representation by the first two-dimensional image of an exterior of a structure;

wherein the first main feature comprises a convex vertical corner of the structure;

and wherein the processor is further configured to identify the first main feature by positioning a vertical line proximate the convex vertical corner.

38. The system of claim 33, wherein the first image type comprises a people image type indicative of representation by the first two-dimensional image of a person;
wherein the first main feature comprises a face of the person;
and wherein the processor is further configured to identify the first main feature by positioning a rectangle to frame the face.

39. The system of claim 33, wherein the first image type comprises a corridor image type indicative of representation by the first two-dimensional image of a corridor within a structure;
wherein the first main feature comprises the corridor;
and wherein the processor is further configured to identify the first main feature by positioning a rectangle to define boundaries of the corridor.

40. The system of claim 33, wherein the first image type comprises a landscape image type indicative of representation by the first two-dimensional image of a landscape comprising a background and a floor;
wherein the first main feature comprises a concave horizontal corner defining an intersection between the background and the floor;
and wherein the processor is further configured to identify the first main feature by positioning a horizontal line proximate the concave horizontal corner.

41. The system of claim 33, wherein the first two-dimensional image comprises an image plane that bounds a field of view;
wherein the first image type comprises a selection from the group consisting of an interior image type and an exterior image type;
wherein the first main feature comprises a vertical corner of a structure;
wherein the processor is further configured to identify the first main feature by positioning a vertical line proximate the vertical corner;
wherein the processor is further configured to generate the first plane by:
defining an ellipse comprising a major axis within the image plane, wherein, at a first major end of the ellipse, the major axis intersects a first edge of the field of view to define a first intersection and, at a second major end of the ellipse, the major axis intersects a second edge of the field of view to define a second intersection; and
defining the first plane such that the first plane passes through the first intersection and the vertical line;
and wherein the processor is further configured to generate the second plane by generating the second plane such that the second plane passes through the second intersection and the vertical line.

42. The system of claim 33, wherein the first two-dimensional image comprises an image plane that bounds a field of view;
wherein the first image type comprises a selection from the group consisting of a people image type and a corridor image type;
wherein the first main feature is selected from the group consisting of a face of a person and a corridor;
wherein the processor is further configured to identify the first main feature by positioning a rectangle proximate the first main feature, the rectangle comprising a first vertical edge and a second vertical edge;
wherein the processor is further configured to generate the first plane by:
defining an ellipse comprising a major axis within the image plane, wherein, at a first major end of the ellipse, the major axis intersects a first edge of the field of view to define a first intersection and, at a second major end of the ellipse, the major axis intersects a second edge of the field of view to define a second intersection; and
defining the first plane such that the first plane passes through the first intersection and the first vertical edge;
wherein the processor is further configured to generate the second plane by generating the second plane such that the second plane is tangent to the ellipse and passes through the first intersection and the second intersection;
wherein the processor is further configured to generate a third plane such that the third plane passes through the second vertical edge and the second intersection;
and wherein the processor is further configured to apply the two-dimensional image to the first plane and the second plane by applying the first two-dimensional image to the third plane to define the first three-dimensional object.

43. The system of claim 33, wherein the first two-dimensional image comprises an image plane that bounds a field of view;
wherein the first image type is a landscape image type;
wherein the first main feature comprises a concave horizontal corner defining an intersection between a background and a floor;
wherein the processor is further configured to identify the first main feature by positioning a horizontal line proximate the concave horizontal corner;
wherein the processor is further configured to generate the first plane by defining the first plane such that the first plane extends horizontally and passes through the horizontal line;
and wherein the processor is further configured to generate the second plane by generating the second plane such that the second plane extends vertically and passes through the horizontal line.

44. The system of claim 33, further comprising:
an input device configured to receive a first user input;
wherein the processor is further configured to:
in response to receipt of the first user input, position the virtual camera at a second camera position offset from the first camera position within the virtual three-dimensional image space; and
using three-dimensional rendering capability of the processor to automatically generate a second three-dimensional view of at least a portion of the first three-dimensional object from the virtual camera; and
and wherein the display screen is further configured to display the second three-dimensional view.

45. The system of claim 44, wherein the input device is further configured to receive a second user input indicating a desire to move the virtual camera to a third virtual camera position;
wherein the processor is further configured to:
in response to receipt of the second user input, determine that, at the third virtual camera position, a field of view of the virtual camera would not be entirely occluded by the first three-dimensional object; and
in response to determining that, at the third virtual camera position, the field of view would not be entirely occluded by the first three-dimensional object, determine that the virtual camera will not be moved to the third virtual camera position.

* * * * *